United States Patent
MacNaughtan et al.

(10) Patent No.: US 8,265,618 B2
(45) Date of Patent: Sep. 11, 2012

(54) MOBILE SERVICE MAINTENANCE MANAGEMENT

(75) Inventors: Malcolm David MacNaughtan, Cherrybrook (AU); Craig Andrew Scott, Mortdale (AU)

(73) Assignee: WaveMarket, Inc., Emeryville, CA (US)

( * ) Notice: Subject to any disclaimer, the term of this patent is extended or adjusted under 35 U.S.C. 154(b) by 725 days.

(21) Appl. No.: 12/084,030

(22) PCT Filed: Oct. 24, 2006

(86) PCT No.: PCT/AU2006/001576
§ 371 (c)(1), (2), (4) Date: Apr. 24, 2008

(87) PCT Pub. No.: WO2007/048176
PCT Pub. Date: May 3, 2007

(65) Prior Publication Data
US 2009/0131038 A1 May 21, 2009

(30) Foreign Application Priority Data

Oct. 24, 2005 (AU) .................................. 2005905863
Nov. 4, 2005 (AU) .................................. 2005906105

(51) Int. Cl.
*H04W 4/00* (2009.01)

(52) U.S. Cl. ............... 455/422.1; 455/423; 455/424; 455/425; 455/456.1; 455/446

(58) Field of Classification Search ............... 455/422.1, 455/404.1, 404.2, 414.1, 423, 424, 425, 456.1, 455/446
See application file for complete search history.

(56) References Cited

U.S. PATENT DOCUMENTS

| | | | |
|---|---|---|---|
| 5,045,861 | A | 9/1991 | Duffett-Smith et al. |
| 5,524,136 | A | 6/1996 | Barnoy et al. |
| 5,564,079 | A | 10/1996 | Olsson |
| 5,666,651 | A | 9/1997 | Wang |
| 5,950,125 | A | 9/1999 | Buhrmann et al. |
| 5,969,679 | A | 10/1999 | Bolliger et al. |
| 5,999,126 | A | 12/1999 | Ito |
| 6,041,236 | A | 3/2000 | Bernardin et al. |
| 6,052,064 | A | 4/2000 | Budnik et al. |
| 6,061,021 | A | 5/2000 | Zibell |
| 6,073,089 | A | 6/2000 | Baker et al. |
| 6,088,598 | A | 7/2000 | Marsolais |

(Continued)

FOREIGN PATENT DOCUMENTS

DE 29919376 2/2000
(Continued)

OTHER PUBLICATIONS

3GPP SA WG2; "Voice Call Continuity Between CS and MS Study"; 3GPP TR 23.806 V7.0.0, Dec. 1, 2005, pp. 1-153.

(Continued)

*Primary Examiner* — Temica M Beamer
(74) *Attorney, Agent, or Firm* — Dovas Law, P.C.

(57) ABSTRACT

Disclosed is a method and system for managing inconsistencies between a radio communications network and a network database. In one aspect, the system is informed of one or more inconsistencies and various decisions are made as to what actions to take. One possible action is to simply inform a network operator of the discrepancy. Another possible action is to determine which network elements are affected by the inconsistency and to update the network database in relation to those network elements to compensate for the inconsistency.

26 Claims, 13 Drawing Sheets

U.S. PATENT DOCUMENTS

Figure 1:
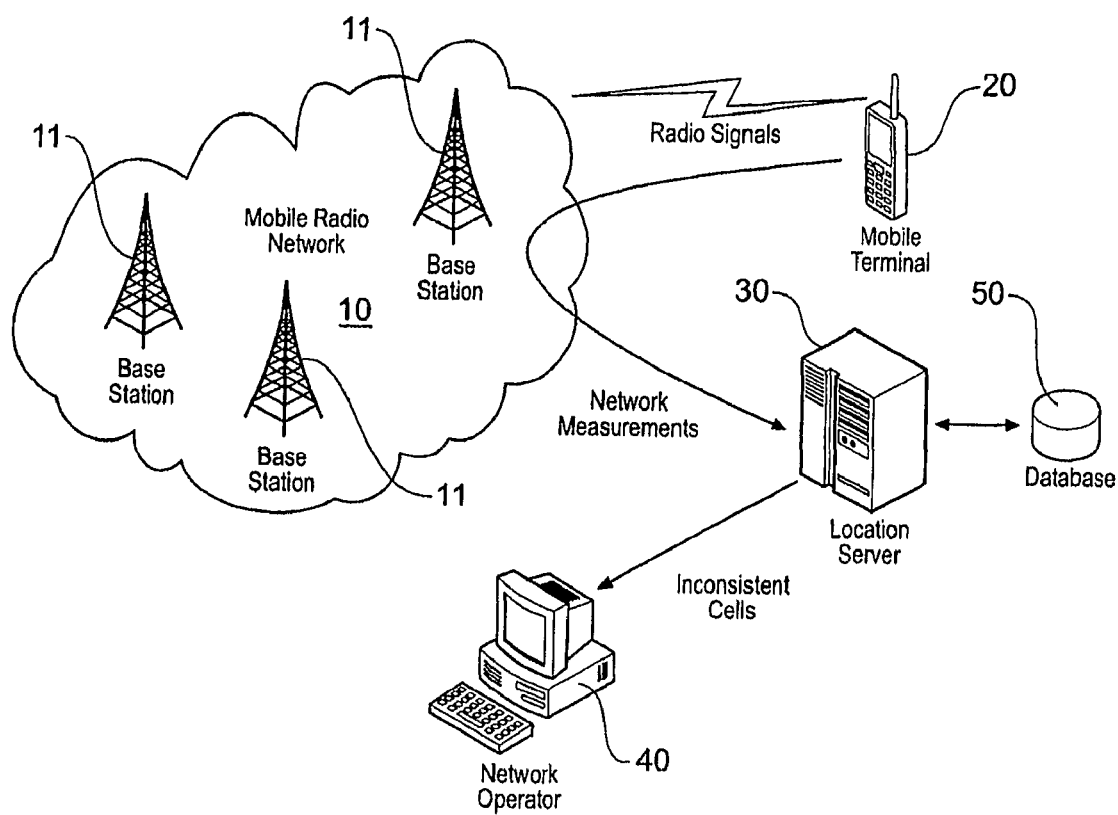

| | | | |
|---|---|---|---|
| 6,097,939 A * | 8/2000 | Jacobs | 455/410 |
| 6,104,344 A | 8/2000 | Wax et al. | |
| 6,167,265 A | 12/2000 | Kim et al. | |
| 6,201,499 B1 | 3/2001 | Hawkes et al. | |
| 6,263,208 B1 | 7/2001 | Chang et al. | |
| 6,266,534 B1 | 7/2001 | Raith et al. | |
| 6,269,246 B1 | 7/2001 | Rao et al. | |
| 6,330,600 B1 | 12/2001 | Matchefts et al. | |
| 6,356,763 B1 | 3/2002 | Kangas et al. | |
| 6,360,094 B1 | 3/2002 | Satarasinghe | |
| 6,393,294 B1 | 5/2002 | Perez-Breva et al. | |
| 6,449,257 B1 | 9/2002 | Choi | |
| 6,449,486 B1 | 9/2002 | Rao | |
| 6,496,701 B1 | 12/2002 | Chen et al. | |
| 6,529,165 B1 | 3/2003 | Duffett-Smith et al. | |
| 6,556,842 B1 | 4/2003 | Ericsson | |
| 6,560,442 B1 | 5/2003 | Yost et al. | |
| 6,567,381 B1 | 5/2003 | Jeon et al. | |
| 6,591,116 B1 | 7/2003 | Laurila et al. | |
| 6,631,262 B1 | 10/2003 | Wee | |
| 6,711,404 B1 | 3/2004 | Arpee et al. | |
| 6,728,539 B2 | 4/2004 | Kuwahara | |
| 6,748,224 B1 | 6/2004 | Chen et al. | |
| 6,782,265 B2 | 8/2004 | Perez-Breva et al. | |
| 6,799,046 B1 | 9/2004 | Tang | |
| 6,834,180 B1 | 12/2004 | Marshall | |
| 6,856,805 B1 | 2/2005 | Raaf | |
| 6,859,654 B1 | 2/2005 | Reynolds et al. | |
| 6,947,734 B1 | 9/2005 | Toubassi | |
| 6,947,835 B2 | 9/2005 | Kaplan et al. | |
| 6,950,664 B2 | 9/2005 | Chen et al. | |
| 6,961,587 B1 | 11/2005 | Vilppula et al. | |
| 7,031,722 B2 | 4/2006 | Naghian | |
| 7,096,115 B1 | 8/2006 | Groth et al. | |
| 7,158,790 B1 | 1/2007 | Elliott | |
| 7,233,800 B2 | 6/2007 | Laroia et al. | |
| 7,289,763 B2 | 10/2007 | Dennison et al. | |
| 7,505,433 B2 | 3/2009 | Yaqub et al. | |
| 7,668,832 B2 | 2/2010 | Yeh et al. | |
| 7,697,920 B1 | 4/2010 | McClain | |
| 7,751,827 B2 | 7/2010 | Poykko et al. | |
| 2001/0022558 A1 | 9/2001 | Karr, Jr. et al. | |
| 2002/0042268 A1 | 4/2002 | Cotanis | |
| 2002/0042269 A1 | 4/2002 | Cotanis | |
| 2002/0101834 A1 | 8/2002 | Stanley | |
| 2002/0111772 A1 | 8/2002 | Skidmore et al. | |
| 2002/0128019 A1 | 9/2002 | Ben-Yair et al. | |
| 2002/0164997 A1 | 11/2002 | Parry | |
| 2002/0168989 A1 | 11/2002 | Dooley et al. | |
| 2002/0173275 A1 | 11/2002 | Coutant | |
| 2002/0193150 A1 | 12/2002 | Pritchard | |
| 2003/0008668 A1 | 1/2003 | Perez-Breva et al. | |
| 2003/0032404 A1 | 2/2003 | Wager et al. | |
| 2003/0040318 A1 | 2/2003 | Fattouch | |
| 2003/0043941 A1 | 3/2003 | Johnson et al. | |
| 2003/0060214 A1 | 3/2003 | Hendrey et al. | |
| 2003/0078042 A1 | 4/2003 | Miriyala et al. | |
| 2003/0078055 A1 | 4/2003 | Smith et al. | |
| 2003/0119501 A1 | 6/2003 | Kim | |
| 2003/0125031 A1 | 7/2003 | Sung Lim et al. | |
| 2003/0147362 A1 | 8/2003 | Dick et al. | |
| 2003/0148771 A1 | 8/2003 | de Verteuil | |
| 2003/0186710 A1 | 10/2003 | Muhonen et al. | |
| 2003/0208589 A1 | 11/2003 | Yamamoto | |
| 2004/0018835 A1 | 1/2004 | Myers et al. | |
| 2004/0037258 A1 | 2/2004 | Scherzer et al. | |
| 2004/0116111 A1 | 6/2004 | Saunders | |
| 2004/0132464 A1 | 7/2004 | Poykko et al. | |
| 2004/0152470 A1 | 8/2004 | Spain | |
| 2004/0157621 A1 | 8/2004 | Yamasaki et al. | |
| 2004/0160365 A1 | 8/2004 | Riley et al. | |
| 2004/0203717 A1 | 10/2004 | Wingrowicz et al. | |
| 2004/0203885 A1 | 10/2004 | Quaid | |
| 2004/0248589 A1 | 12/2004 | Gwon et al. | |
| 2005/0012613 A1 | 1/2005 | Eckstein et al. | |
| 2005/0040968 A1 | 2/2005 | Damarla et al. | |
| 2005/0066325 A1 | 3/2005 | Mori et al. | |
| 2005/0113117 A1 | 5/2005 | Bolin et al. | |
| 2005/0134696 A1 | 6/2005 | Nath et al. | |
| 2005/0136938 A1 | 6/2005 | Kang | |
| 2005/0169183 A1 | 8/2005 | Lakkakorpi | |
| 2005/0192031 A1 | 9/2005 | Vare | |
| 2005/0210342 A1 | 9/2005 | Schwagmann | |
| 2005/0227683 A1 | 10/2005 | Draluk et al. | |
| 2005/0239478 A1 | 10/2005 | Spirito | |
| 2005/0282540 A1 | 12/2005 | Motamedi et al. | |
| 2005/0282544 A1 | 12/2005 | Oommen et al. | |
| 2005/0283540 A1 | 12/2005 | Fux et al. | |
| 2006/0019665 A1 | 1/2006 | Aghvami et al. | |
| 2006/0019679 A1 | 1/2006 | Rappaport et al. | |
| 2006/0025068 A1 | 2/2006 | Regan et al. | |
| 2006/0025158 A1 | 2/2006 | Leblanc et al. | |
| 2006/0052057 A1 | 3/2006 | Perrson et al. | |
| 2006/0064346 A1 | 3/2006 | Steenstra et al. | |
| 2006/0087425 A1 | 4/2006 | Haeberlen | |
| 2006/0221901 A1 | 10/2006 | Yaqub et al. | |
| 2006/0227045 A1 | 10/2006 | Sheynblat | |
| 2006/0234701 A1 | 10/2006 | Wang et al. | |
| 2006/0270421 A1 | 11/2006 | Phillips et al. | |
| 2007/0001867 A1 | 1/2007 | Rowe et al. | |
| 2007/0087764 A1 | 4/2007 | Buckley et al. | |
| 2007/0121520 A1 | 5/2007 | Shrikhande et al. | |
| 2007/0123268 A1 | 5/2007 | Parata | |
| 2007/0208495 A1 | 9/2007 | Chapman et al. | |
| 2007/0270168 A1 | 11/2007 | Sheynblat | |
| 2007/0297346 A1 | 12/2007 | Huisman et al. | |
| 2008/0004037 A1 | 1/2008 | Achlioptas et al. | |
| 2008/0061967 A1 | 3/2008 | Corrado | |
| 2009/0160939 A1 * | 6/2009 | Fernandez et al. | 348/158 |
| 2009/0182630 A1 | 7/2009 | Otto et al. | |
| 2010/0167725 A1 | 7/2010 | Noldus et al. | |
| 2011/0244919 A1 | 10/2011 | Aller et al. | |

FOREIGN PATENT DOCUMENTS

| | | |
|---|---|---|
| EP | 0431956 A2 | 7/1990 |
| EP | 0874248 | 10/1998 |
| EP | 0936758 | 8/1999 |
| EP | 0982964 | 3/2000 |
| EP | 1030531 | 8/2000 |
| EP | 1137305 | 9/2001 |
| EP | 1175115 | 1/2002 |
| EP | 1120632 | 8/2002 |
| EP | 1235076 | 8/2002 |
| EP | 1271101 | 1/2003 |
| EP | 1304897 | 4/2003 |
| EP | 0767594 | 11/2003 |
| EP | 1677562 | 7/2006 |
| EP | 2083576 | 7/2009 |
| GB | 2352134 | 1/2001 |
| GB | 2358500 | 7/2001 |
| GB | 2364617 | 1/2002 |
| JP | 7255079 | 10/1995 |
| JP | 2001-330657 | 11/2001 |
| JP | 2004-104349 | 4/2004 |
| JP | 08-365824 | 11/2006 |
| WO | WO/9202105 | 6/1992 |
| WO | WO/9315569 | 8/1993 |
| WO | WO/9535636 | 12/1995 |
| WO | WO/9711384 | 3/1997 |
| WO | WO/9812885 | 3/1998 |
| WO | WO 9843450 | 10/1998 |
| WO | WO/9848578 | 10/1998 |
| WO | WO/9913662 | 3/1999 |
| WO | WO/0018148 | 3/2000 |
| WO | WO/0028755 | 5/2000 |
| WO | WO/0103372 | 1/2001 |
| WO | WO/0137601 | 5/2001 |
| WO | WO 0195592 | 12/2001 |
| WO | WO/0199082 | 12/2001 |
| WO | WO 02/047421 | 6/2002 |
| WO | WO/02073997 | 9/2002 |
| WO | WO/02082850 | 10/2002 |
| WO | WO/03087869 | 10/2003 |
| WO | WO 2004034721 | 4/2004 |
| WO | WO/2004047315 | 6/2004 |
| WO | WO/2004079478 | 9/2004 |
| WO | WO/2004080105 | 9/2004 |

| | | |
|---|---|---|
| WO | WO/2004084022 | 9/2004 |
| WO | WO/2005009020 | 1/2005 |
| WO | WO/2005109695 | 11/2005 |
| WO | WO/2006026816 | 3/2006 |
| WO | WO/2006053835 | 5/2006 |
| WO | WO/2006059188 | 6/2006 |
| WO | WO/2006087438 | 8/2006 |
| WO | WO/2006096922 | 9/2006 |
| WO | WO/2006096923 | 9/2006 |
| WO | WO/2006105618 | 10/2006 |
| WO | WO/2006105619 | 10/2006 |
| WO | WO/2006112561 | 10/2006 |
| WO | WO/2006125085 | 11/2006 |
| WO | WO/2007017691 | 2/2007 |
| WO | WO/2007020635 | 2/2007 |
| WO | WO 2007/040320 A1 | 4/2007 |
| WO | WO/2007040320 | 4/2007 |
| WO | WO/2007048176 | 5/2007 |
| WO | WO/2007048177 | 5/2007 |
| WO | WO/2007051223 | 5/2007 |
| WO | WO/2007071271 | 6/2007 |
| WO | WO/2007102816 | 9/2007 |
| WO | WO/2007115777 | 10/2007 |
| WO | WO/2008055302 | 5/2008 |
| WO | WO/2008059570 | 5/2008 |
| WO | WO/2008109948 | 9/2008 |
| WO | WO/2009036497 | 3/2009 |
| WO | WO/2009067766 | 6/2009 |
| WO | WO 2009080105 | 7/2009 |
| WO | WO/2009124348 | 10/2009 |
| WO | WO/2009124349 | 10/2009 |
| WO | WO/2010022470 | 3/2010 |
| WO | WO 2010090558 | 8/2010 |

OTHER PUBLICATIONS

3GPP TR25.942, Radio Frequency (RF) system scenarios, section 5.1.4.
3GPP TS 05.08 V8.23.0; Radio subsystem link control, Nov. 2005.
Drane, Positioning Systems, a Unified Approach, Springer Verlag, 1992.
European Search Report dated Dec. 22, 2009 for EP06721360.3.
European Search Report dated Feb. 19, 2009 for EP06705017.9.
European Search Report dated Feb. 19, 2010 for EP06721361.1.
European Search Report dated Jul. 7, 2010 for EP06705018.7.
European Search Report dated Mar. 23, 2007 for EP04737602.5.
European Search Report dated Nov. 4, 2010 for EP08714391.3.
Evaluation of positioning measurement systems, T1P1.5197[98]-110, Dec. 1997, Section 3.2.
IEEE VTS Committee, Coverage prediction for mobile radio systems operating in the 800/900 MHz frequency range, IEEE Transactions on VTC, vol. 37, No. 1, Feb. 1998.
International Search Report dated Apr. 26, 2006 for PCT/AU2006/000347.
International Search Report dated Apr. 26, 2006 for PCT/AU2006/000348.
International Search Report dated Dec. 19, 2006 for PCT/AU2006/001576.
International Search Report dated Dec. 5, 2005 for PCT/AU2005/001358.
International Search Report dated Feb. 19, 2008 for PCT/AU2007/001706.
International Search Report dated Jan. 15, 2009 for PCT/AU2008/001783.
International Search Report dated Jan. 24, 2007 for PCT/AU2006/001479.
International Search Report dated Jun. 1, 2009 for PCT/AU2009/000436.
International Search Report dated Jun. 29, 2006 for PCT/AU2006/000478.
International Search Report dated May 11, 2009 for PCT/AU2009/000438.
International Search Report dated May 31, 2006 for PCT/AU2006/000479.
International Search Report dated May 7, 2008 for PCT/AU2008/000344.
International Search Report dated Nov. 24, 2008 for PCT/AU2008/001374.
International Search Report dated Nov. 25, 2009 for PCT/AU2009/001123.
International Search Report dated Nov. 28, 2006 for PCT/AU2006/001577.
International Search Report dated Sep. 20, 2004 for PCT/AU2004/000983.
Lee, Mobile Communications Engineering, McGraw-Hill 1982.
Mir; A Zone Based Location Service for Mobile Ad hoc Networks; IEEE; 2004; pp. 1-5.
Munteanu; Zone Profile Generation for Location Based Services and Traffic Analysis; 12th WSEAS Int'l Conf. on Commc'ns; Jul. 23-25, 2008; pp. 386-390.
O'Rourke, Computational Geometry in C (Cambridge Tracts in Theoretical Computer Science), Cambridge University Press, 2000 ed.
Saunders, Antennas and propagation for Wireless Communication Systems, 2ed. Wiley, 2007.
Steele, Mobile Radio Communications, 2ed.,Wiley & Sons, 1999, section 2.7.
Specification 3GPP TS 23.048, "Technical Specification Group Core Network and Terminals; Security Mechanisms for the (U)SIM Application Toolkit", 2005-2006.
Specification 3GPP TS 25.304 "User Equipment (UE) Procedures in Idle Mode and Procedures for Cell Reselection in Connected Mode", 2011.
Specification 3GPP TS 03.22, "Radio Access Network; Functions Related to Mobile Station(MS) in Idle Mode and Group Receive Mode", 1999.
M. Hata, "Empirical formula for propagation loss in land mobile radio services" IEEE Transactions on Vehicular Technology, vol. VT-29, pp. 317-325, Aug. 1980.
T. Roos, P. Myllymaki, and H. Tirri, "A statistical modeling approach to location estimation," IEEE Transactions on Mobile Computing vol. 1, pp. 59-69, Jan. 2002.
T. Halonen J. Romero and J. Melero, GSM, GPRS and EDGE Performance; Evolution Towards SG/UMTS. John Wiley and Sons, 2nd ed., 2003.
L.M. Correia, Wireless Flexible Personalized Communications: COST 259 European Co-Operation in Mobile Radio Research. Wiley 2001.
Schwartz et al., "On the Distribution and Moments of Power Sums with Logonormal Components", Bell Sys. Tech, J., vol. 61, No. 7, pp. 1441-1463.
Balis P. G. et al. "UTD-Based Model for Prediction of Propagation Path Loss and Shadowing Variability in Urban Mobile Environments" IEE Proceedings: Microwaves, Antennas and Propagation, IEE, Stevenage, Herts, GB, vol. 144 No. 5 Oct. 9, 1997, pp. 367-371 XP006008788 ISSN: 1350-2417.
Bernardin et al., "Cell Radius Inaccuracy: A New Measure of Coverage Reliability", IEEE Transactions on Vehicular Technology, vol. 47, No. 4, Nov. 1998.
W.H. Press S. A. Teukolsky, W.T. Vetterling & B.P. Flannery, "Numerical Recipes in C++; The Art of Scientific Computing", 2nd Ed, Feb. 2002, Cambridge University Press.
A.M. Zoubir and B. Boobash, "The Bootstrap and Its Application in Signal Processing," IEEE Signal Processing Magazine, 15(1):56-76, Jan. 1998.
Martin Hellenbrandt, Rudolf Mathar and Scheibenbogen Markus, "Estimating Position and Velocity of Mobiles in a Cellular Radio Network," IEEE Transactions on Vehicular Technology, 46(1): 65-71, Feb. 1997.
B. Matsumori T1P1.5/98-600 "Radio Camera System and Location Fingerprinting Technology", Presentation Submission to Location Standards Working Group T1P1.5 by U.S. Wireless 1998.
Annex I of GSM 05.05 "Digital cellular Telecommunication System (Phase 2)", Radio Transmission and Reception, 2001.
Specification 3GPP TS 31.111—Sections 6.4, 6.616, 6.6.21 and 6.6.22.
OMA Download Architecture—Version 1.0, Jun. 25, 2004.

International Search Report dated Nov. 3, 2011 for PCT/AU2011/001038.
European Search Report dated Mar. 12, 2012 for European Patent Application 06804431.2.
European Search Report dated Mar. 2, 2012 for European Patent Application 09729670.1.
European Search Report dated Feb. 24, 2012 for European Patent Application 09729862.4.
European Search Report dated Feb. 22, 2012 for European Patent Application 08714391.3.
European Search Report dated Mar. 12, 2012 for European Patent Application 06790414.4.
European Search Report dated Mar. 9, 2012 for European Patent Application 08800009.6.

* cited by examiner

MOBILE SERVICE MAINTENANCE MANAGEMENT

TECHNICAL FIELD

The present invention relates to mobile radio communication networks and to their management.

CROSS REFERENCE TO RELATED APPLICATIONS

This application is the National Phase application of International Application No. PCT/AU2006/001576, filed 24 Oct. 2006, which claims priority to Australian Application No. 2005905863, filed 24 Oct. 2005 and Australian Application No. 2005906105, filed 4 Nov. 2005. Each of these applications, in its entirety, is incorporated herein by reference.

INCORPORATION BY REFERENCE

The following co-pending patent applications are referred to in the following description:
PCT/AU2005/001358 entitled "Radio Mobile Unit Location System";
PCT/AU2006/000347 entitled "Enhanced Mobile Location Method and System";
PCT/AU2006/000348 entitled "Enhanced Mobile Location"
PCT/AU2006/000478 entitled "Enhanced Terrestrial Mobile Location"
PCT/AU2006/000479 entitled "Mobile Location"
PCT/AU2006/001479 entitled "Profile Based Communications Service"
Co-pending International Patent Application entitled "Detection in Mobile Service Maintenance" filed concurrently herewith and claiming priority from Australian Provisional Patent Application No. 2005905863
section 2.7 of Mobile Radio Communications $2^{nd}$ Ed. Editors Steele and Hanzo. ISBN 047197806X, J. Wiley & Sons Ltd, 1999
Section 5.1.4 of "Radio Frequency (RF) system scenarios" 3GPP TR25.942
Section 3.2 of "Evaluation of Positioning Measurement Systems", T1P1.5/98-110).
The entire content of each of these documents is hereby incorporated by reference.

BACKGROUND

Radio communication networks often use information representing certain characteristics or parameters of different parts of the network. For example, some mobile radio location systems operate by using radio measurements to estimate the location of mobile terminals relative to the known locations of the radio network access points. For the special case of cellular mobile phone location systems these access points are the cells.

A location system which estimates the location of a mobile terminal relative to one or more radio network access points requires knowledge of the relevant characteristics of those access points. For example, in a coarse cell identifier based mobile cellular location system, the relevant characteristics typically include the unique identifier for the cell and the geographical coordinates at which the cell is situated.

More accurate systems such as those which also incorporate radio signal measurements in the calculation process require additional configuration information. This typically includes transmitted power, antenna gain and antenna orientation.

The performance of such location systems is strongly dependent on the integrity of the database containing this network configuration information. This dependence increases in systems promising greater levels of spatial resolution or accuracy. In an ideal world, the configuration of the cellular network will match the network database. Experience has shown however, that typically the configuration information is poorly maintained, distributed across multiple databases and exhibits many errors.

Reasons for discrepancies between the supplied database and actual configuration may lie with the network database or with the network configuration or both. The database may be at fault due to errors such as typographical errors, especially the transposition of numbers, during data entry; problems with the process used to collect and collate the network data; and failure to propagate network configuration changes to the database. Conversely the network configuration may not be as intended due to errors such as typographical errors when entering configuration details and failure to configure one or more planned network changes.

A further problem for operators is that the network configuration is not static. Opportunities for inconsistencies to arise between the network database and deployed configuration occur throughout the life of the network. The network configuration changes when sites are added to increase capacity and/or coverage. Changes also occur when cells are decommissioned. When mobile cells (referred to as Cells-On-Wheels) are setup to support the capacity increases required to support events such as significant sporting events and outdoor music concerts. These temporary additions and deletions to the network can last for hours and in some cases days. The configuration may change temporarily when there is a cell not operating due to scheduled maintenance, equipment failure, or power failure. The network also changes when technicians retune the network to improve performance or to adapt to changes due to reasons discussed above.

Network database errors lead to corresponding errors in the operation of the location-based system and associated services, in some cases leading to unacceptable service quality for subscribers. Network operators have no means of validating that the network is configured as planned other than to perform drive tests around the network with radio monitoring equipment. The cost of updating the database so that it is continually up-to-date represents a significant operational burden for the service provider.

Operators of mobile radio networks change the configuration of and add to the network for reasons such as performance improvement and capacity increases. When these changes are made all associated location systems need to be updated with the changed configuration. Failure to do so will degrade the performance of the location system, possibly to the point where the location system is ineffective.

It is an object of the present invention to facilitate the correction and maintenance of mobile network configuration information.

SUMMARY

According to one aspect of the present invention, there is provided a method for managing an inconsistency between a radio communications network and a network database, the method comprising:
receiving a notification of the inconsistency; and
taking action in response to the receipt of the inconsistency.

In one form, the step of taking action comprises informing a system operator of the inconsistency.

In another form, the step of taking action comprises updating the network database to remove the inconsistency.

In one form, the step of updating the network database comprises updating respective network databases on one or more mobile radio terminals in the radio communications network.

In one form, the step of taking action comprises flagging data in the network database relating to the inconsistency such that the flagged data will be ignored.

According to another aspect of the present invention, there is provided a system for managing an inconsistency between a radio communications network and a network database, the system comprising:

means for receiving a notification of the inconsistency; and
  means for taking action in response to the receipt of the inconsistency.

In one form, the means for taking action comprises means for informing a system operator of the inconsistency.

In another form, the means for taking action comprises means for updating the network database to remove the inconsistency.

In one form, the means for updating the network database comprises means for updating respective network databases on one or more mobile radio terminals in the radio communications network.

In one form, the means for taking action comprises means for flagging data in the network database relating to the inconsistency such that the flagged data will be ignored.

According to a further aspect of the present invention, there is provided a method of managing an inconsistency between a radio communications network and a network database, the method comprising:

receiving a notification of the inconsistency;
  determining whether any mobile radio terminals in the radio communications network are affected by the inconsistency; and
  transmitting a communication to one or more of the mobile radio terminals that were determined to be affected by the inconsistency to compensate for the inconsistency.

In one form, the step of determining whether any mobile radio terminals are affected by the inconsistency comprises determining whether one or more zones defined in the radio communications network are affected by the inconsistency and determining whether any mobile radio terminals are associated with one or more of the one or more zones.

In one form the method further comprises updating respective profiles defining the one or more zones determined to be affected by the inconsistency.

In one form, the step of transmitting a communication to the one or more of the mobile radio terminals that were determined to be affected by the inconsistency comprises transmitting the updated profile to the one or more mobile radio terminals.

In a further form, the step of transmitting the communication to the one or more of the mobile radio terminals that were determined to be affected by the inconsistency to compensate for the inconsistency comprises transmitting an ignore flag such that data associated with the inconsistency is ignored.

According to another aspect of the present invention, there is provided a system for managing an inconsistency between a radio communications network and a network database, the system comprising:

means for receiving a notification of the inconsistency;
  means for determining whether any mobile radio terminals in the radio communications network are affected by the inconsistency; and
  means for transmitting a communication to one or more of the mobile radio terminals that were determined to be affected by the inconsistency to compensate for the inconsistency.

In one form, the means for determining whether any mobile radio terminals are affected by the inconsistency comprises means for determining whether one or more zones defined in the radio communications network are affected by the inconsistency and means for determining whether any mobile radio terminals are associated with one or more of the one or more zones.

In one form, the system further comprises means for updating respective profiles defining the one or more zones determined to be affected by the inconsistency.

In one form, the means for transmitting a communication to the one or more of the mobile radio terminals that were determined to be affected by the inconsistency comprises means for transmitting the updated profile to the one or more mobile radio terminals.

In one form, the means for transmitting the communication to the one or more of the mobile radio terminals that were determined to be affected by the inconsistency to compensate for the inconsistency comprises means for transmitting an ignore flag such that data associated with the inconsistency is ignored.

In one form, the means for determining whether any mobile radio terminals in the radio communications network are affected by the inconsistency and the means for transmitting a communication to one or more of the mobile radio terminals that were determined to be affected by the inconsistency to compensate for the inconsistency are provided by a network processor.

In a further form, the network processor is a location server.

According to a further aspect of the present invention, there is provided a method for managing a change in a radio communications network, the method comprising:

identifying one or more zones defined by a respective profile in the radio communications network that are affected by the change, the respective profile containing data relating to one or more cells;
  for each cell in the respective profile, determining whether the cell is significantly affected by the change; and
  if the cell is determined to be significantly affected by the change, flagging the respective profile for updating to compensate for the change.

In one form, the change is a new base station in the radio communications network.

In another form, the change is due to a non-operational base station.

According to yet a further aspect of the present invention, there is provided a system for managing a change in a radio communications network, the system comprising:

means for identifying one or more zones defined by a respective profile in the radio communications network that are affected by the change, the respective profile containing data relating to one or more cells;
  means for, for each cell in the respective profile, determining whether the cell is significantly affected by the change; and means for, if the cell is determined to be significantly affected by the change, flagging the respective profile for updating to compensate for the change.

In one form, the means for identifying one or more zones defined by a respective profile in the radio communications network that are affected by the change, the respective profile containing data relating to one or more cells; the means for, for each cell in the respective profile, determining whether the cell is significantly affected by the change; and the means for, if the cell is determined to be significantly affected by the change, flagging the respective profile for updating to compensate for the change, are provided by a network processor.

In a further form, the network processor is a location server.

FIGURES

Figure 2:
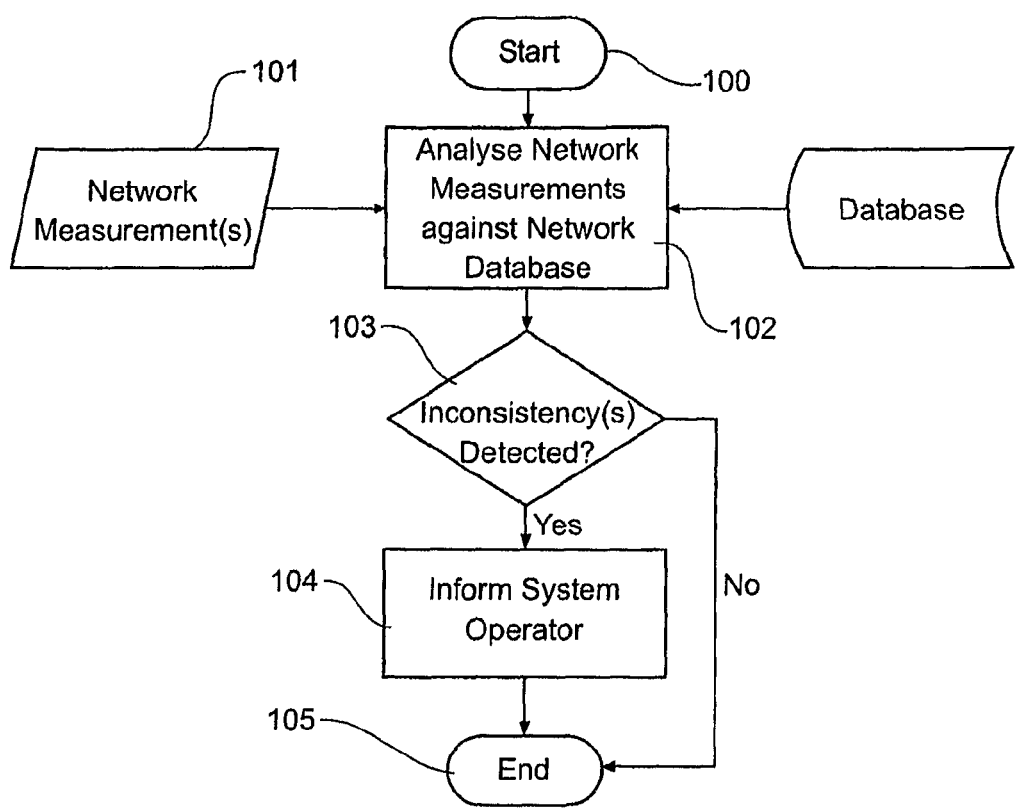

Various embodiments and aspects of the present invention will now be described with reference to the following figures in which:

FIG. 1—shows an architecture for detecting inconsistencies and reporting to an operator;

FIG. 2—shows a process flow for detecting inconsistencies and informing a system operator.

Figure 3:
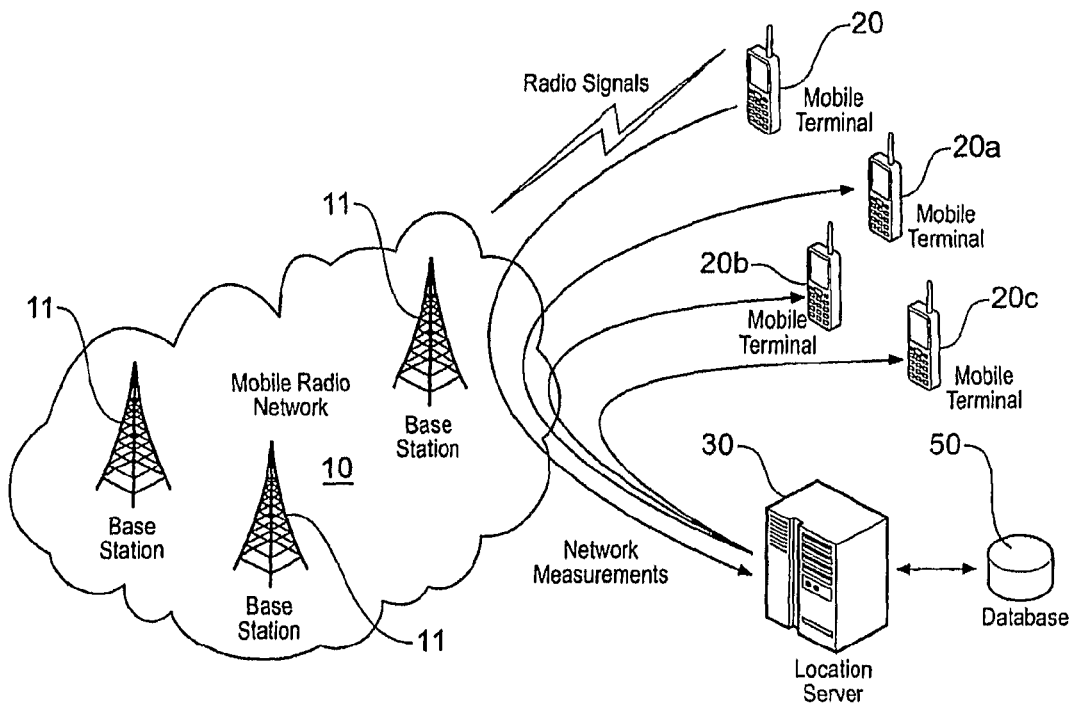
Figure 4:
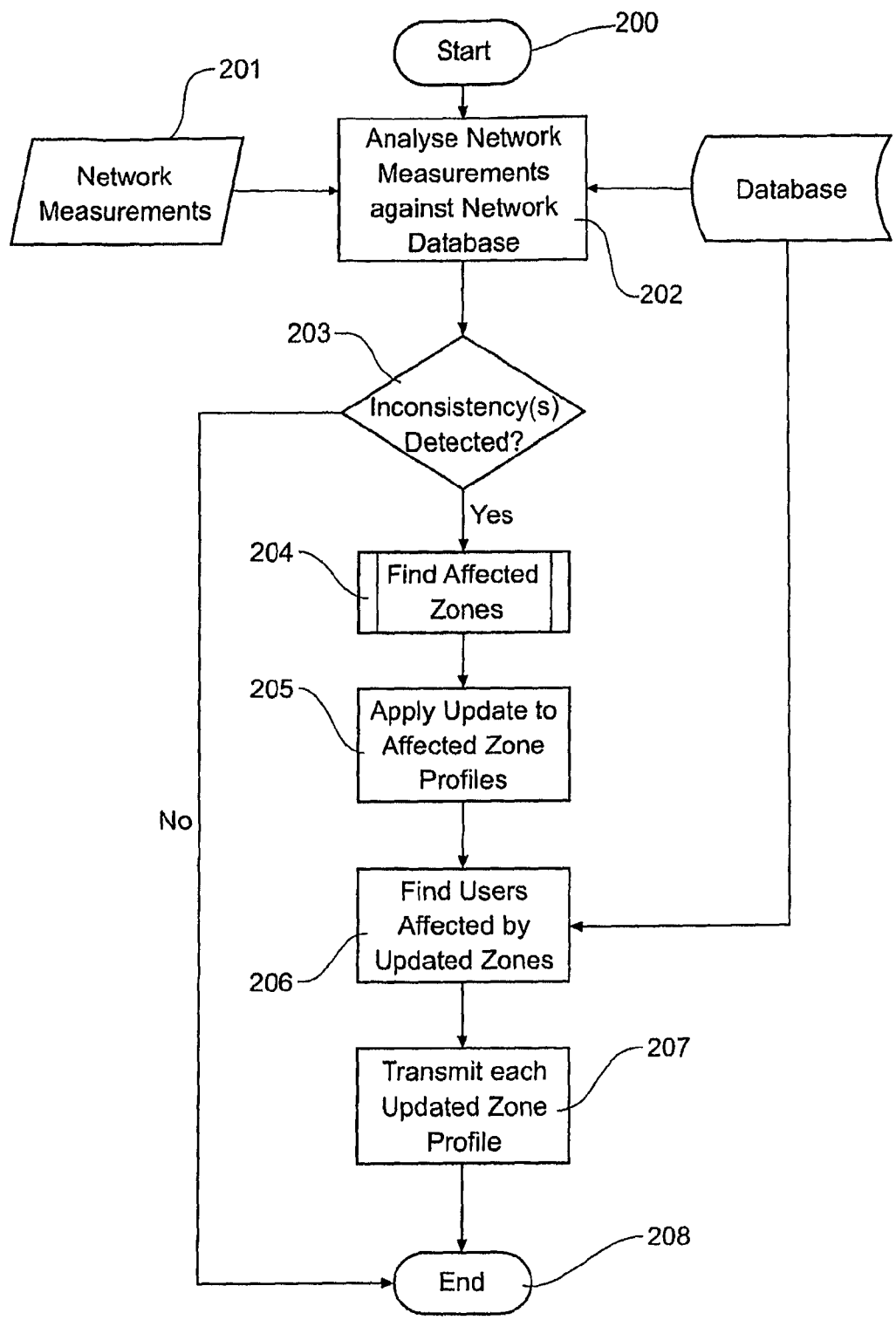
Figure 5:
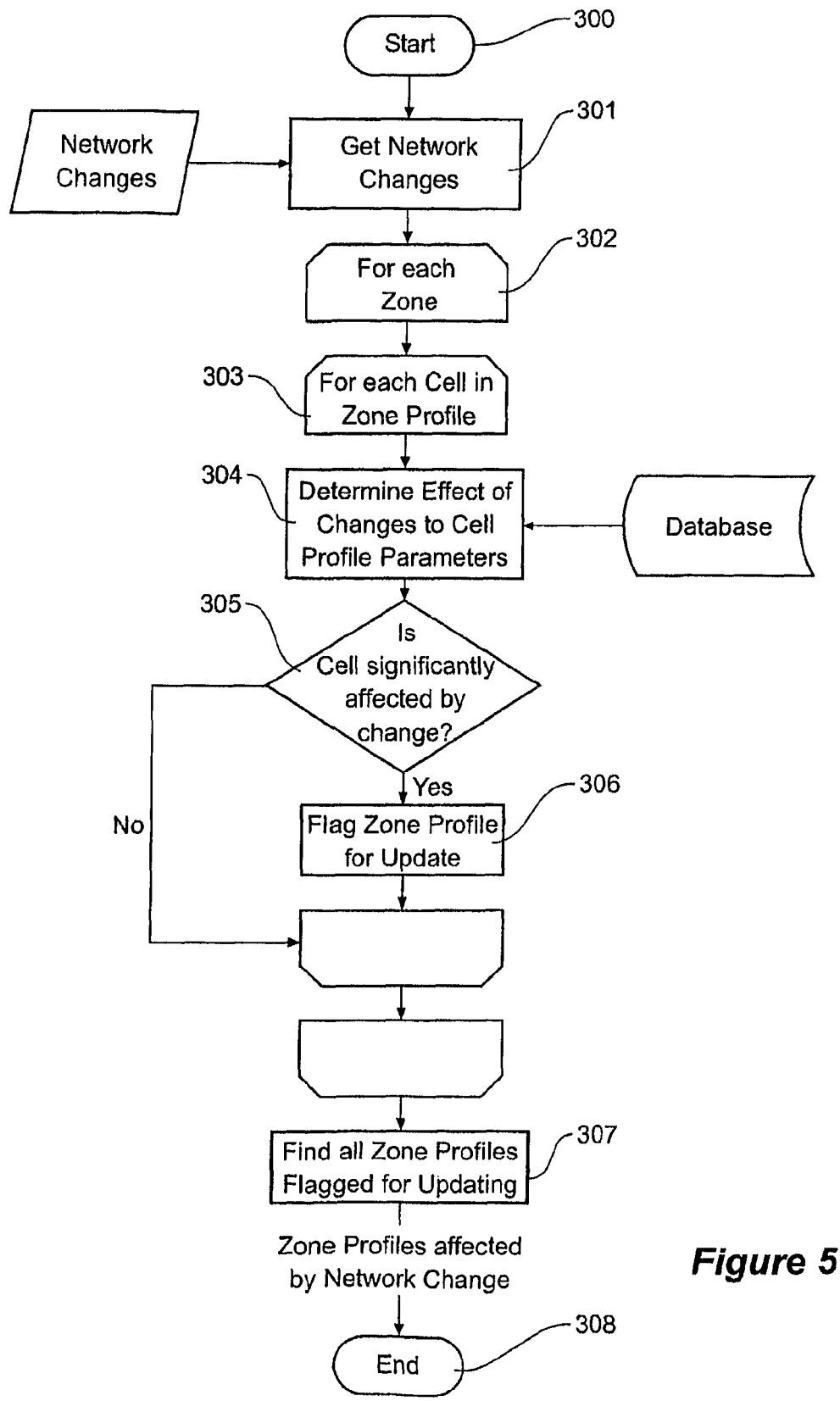
Figure 6:
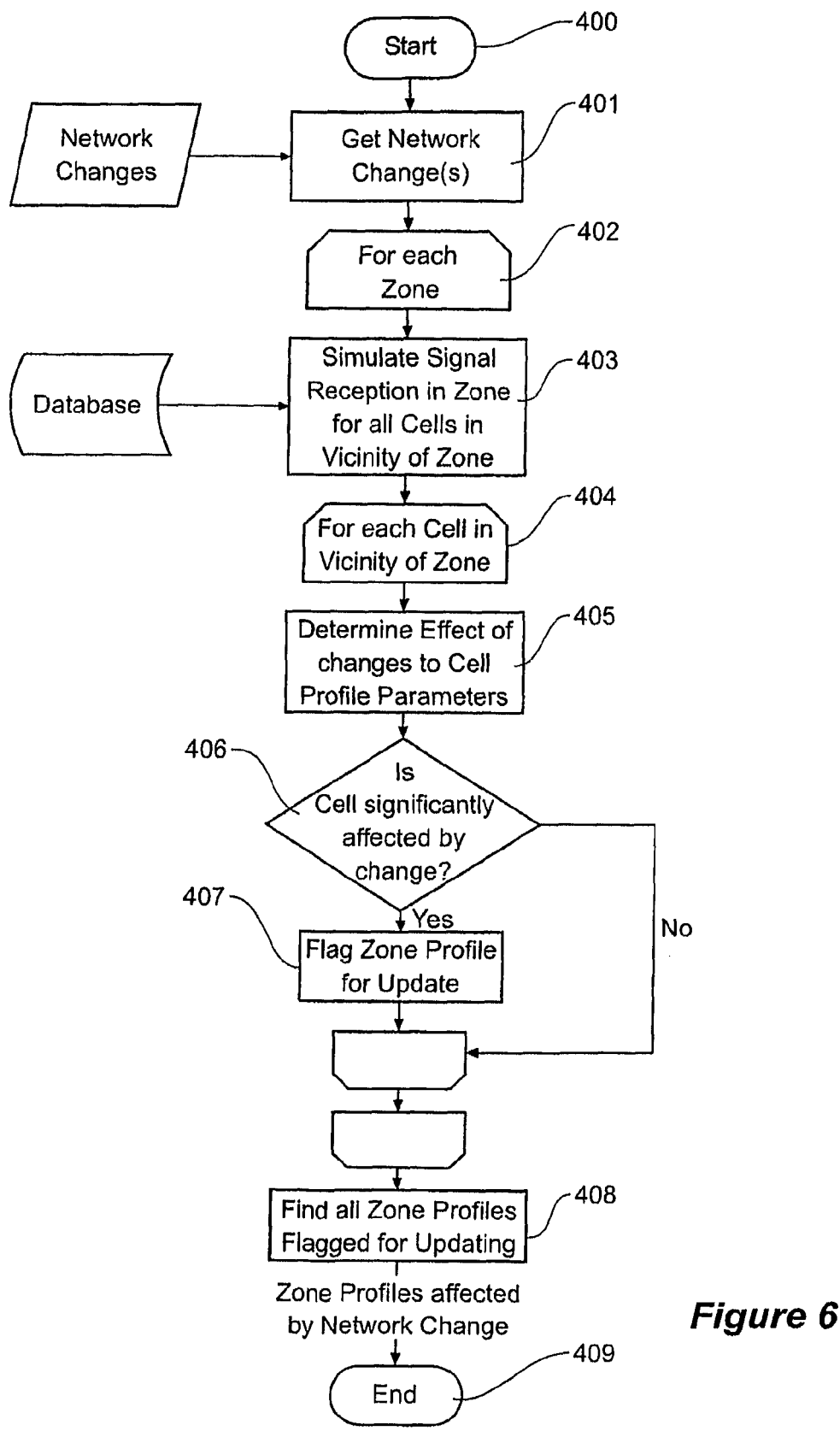
Figure 7:
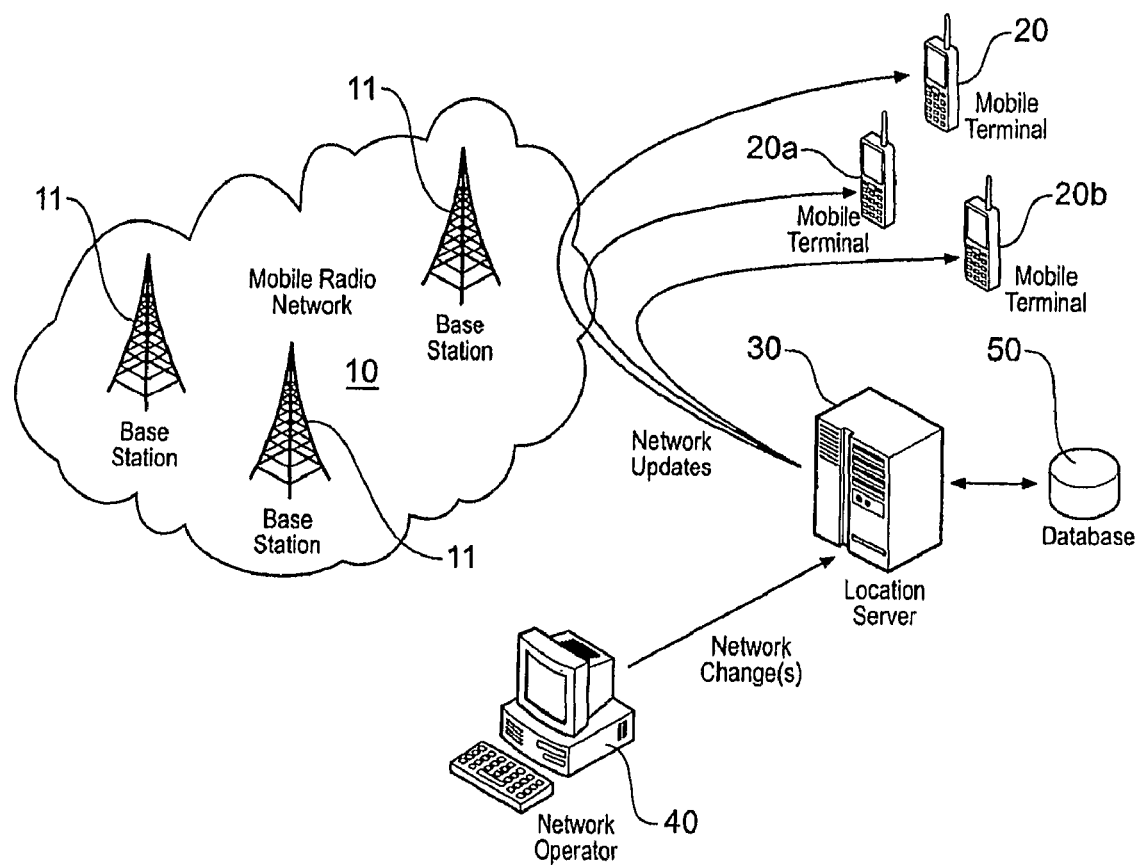
Figure 8:
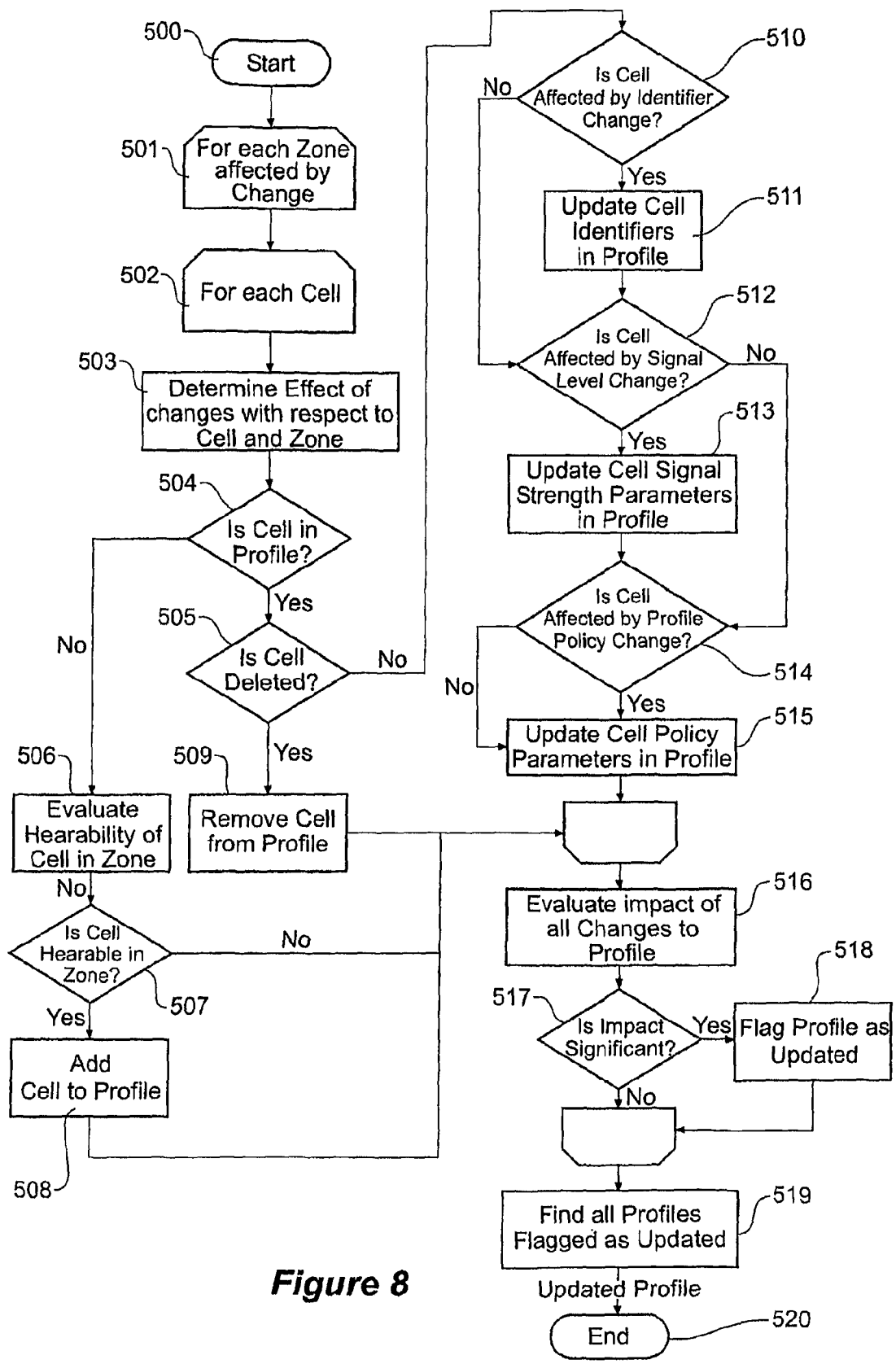
Figure 9:
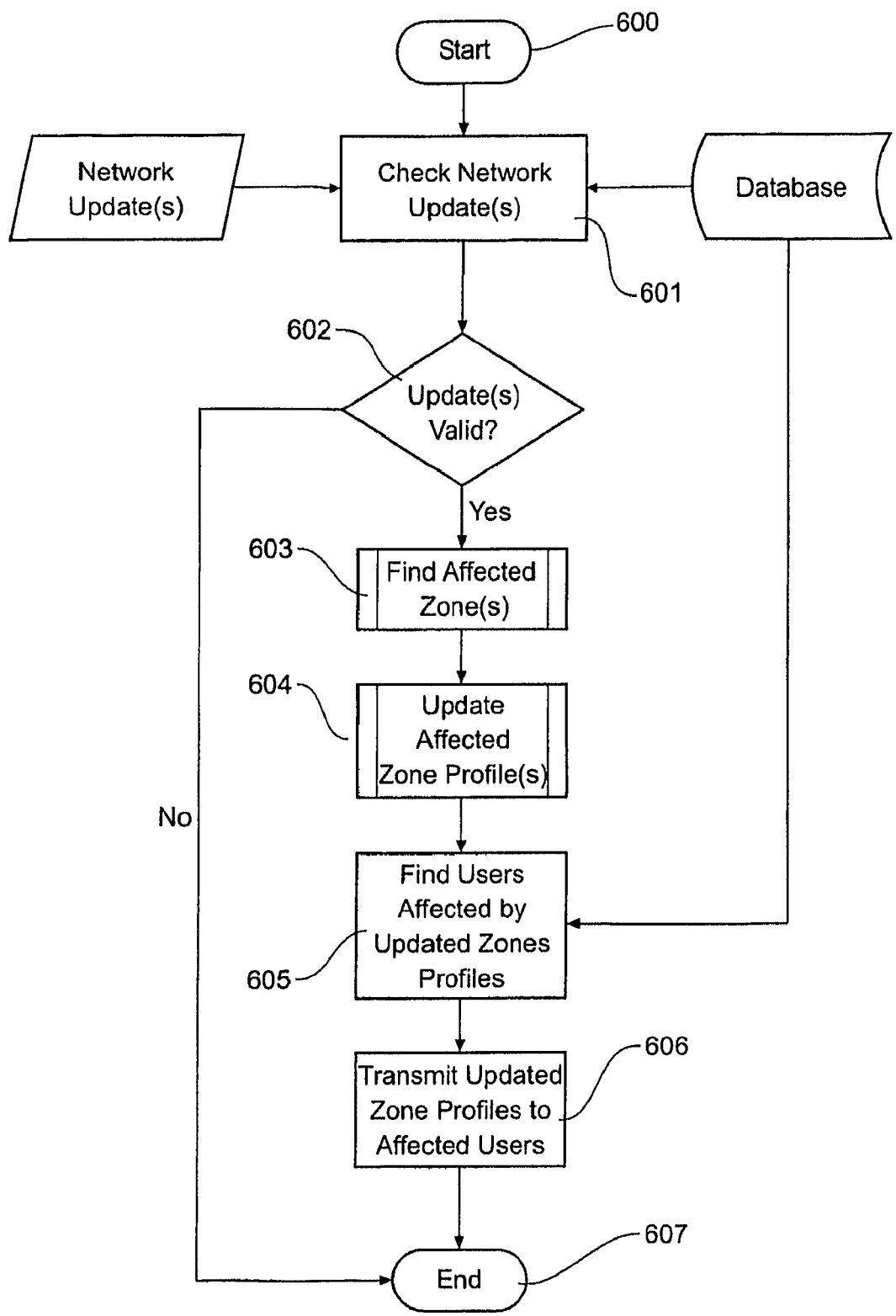
Figure 10:
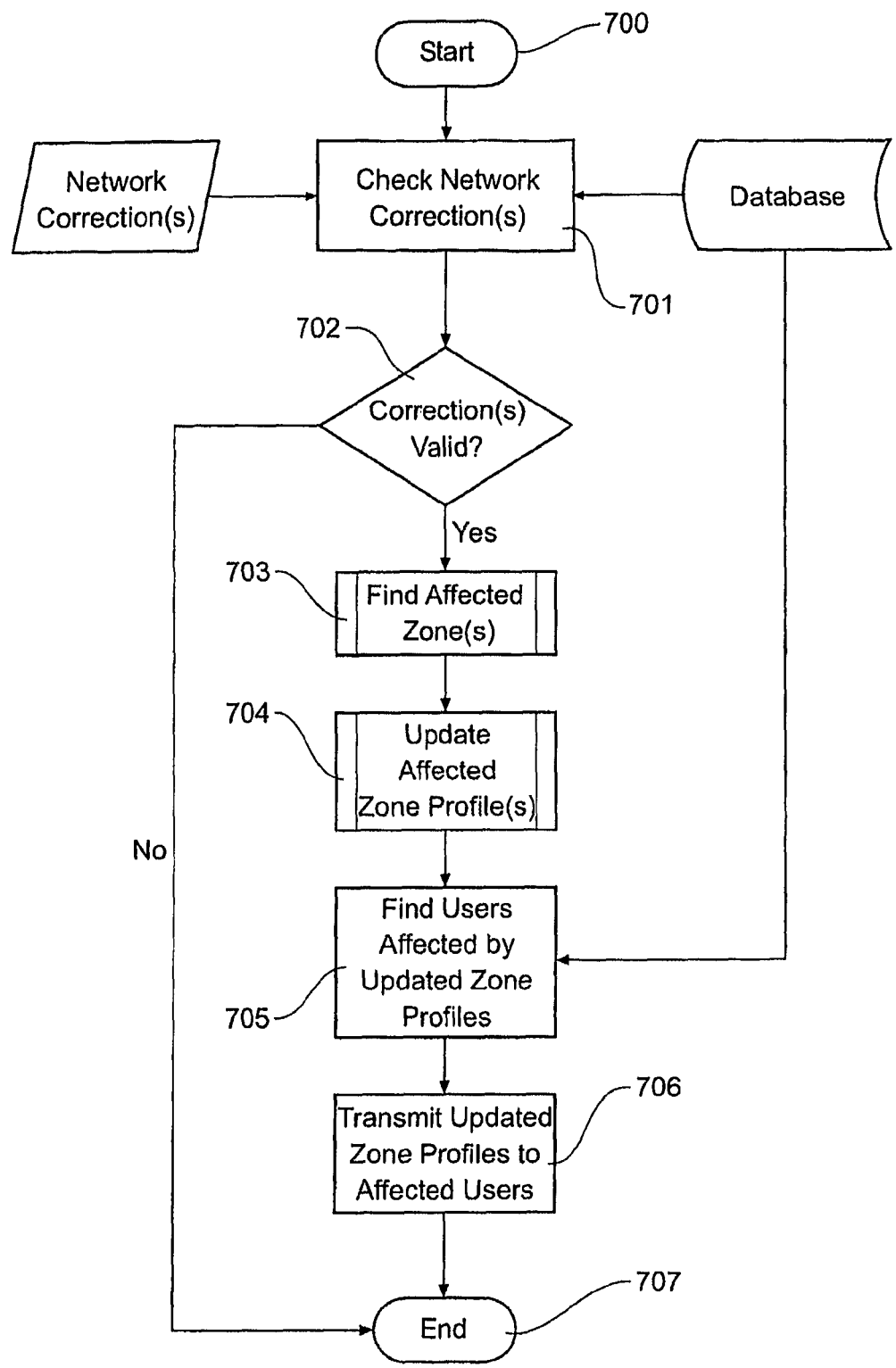
Figure 11:
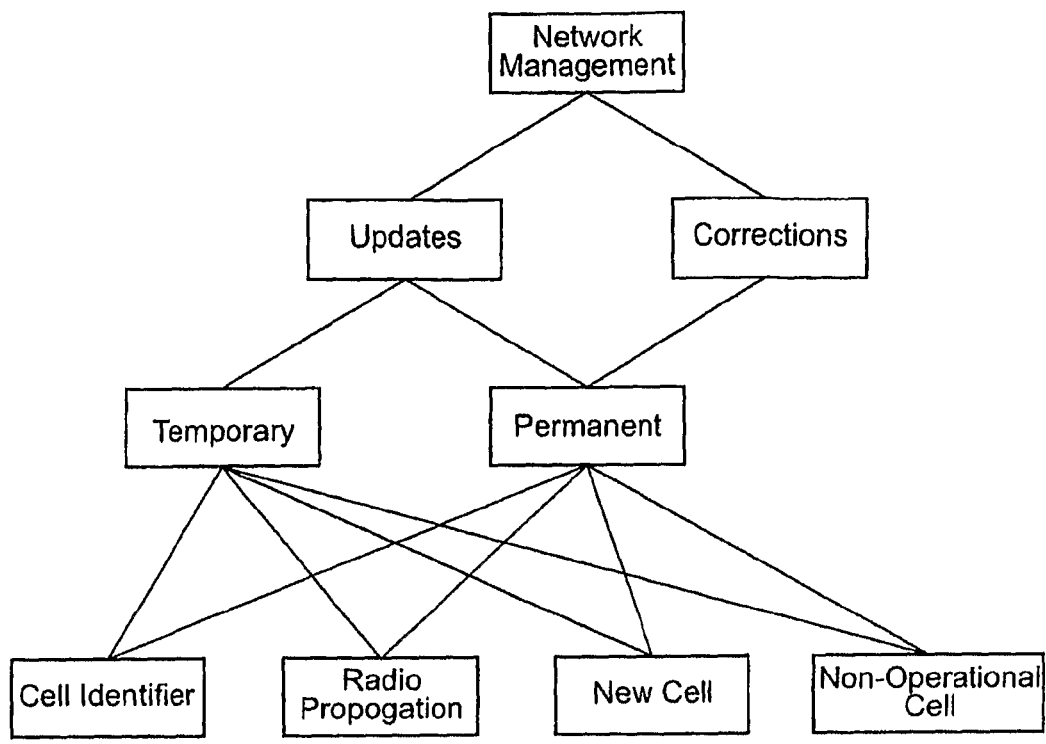

FIG. 3—shows an architecture for detecting inconsistencies and automatically compensating;

FIG. 4—shows a process flow for detecting inconsistencies and automatically compensating;

FIG. 5—shows a process flow for finding zones affected by network changes;

FIG. 6—shows a process flow chart for finding zones affected by network changes based on radio network simulation;

FIG. 7—shows an architecture for updating a system due to network changes;

FIG. 8—shows a process flow for updating zone profiles;

FIG. 9—shows a process flow for adjusting a system to network updates;

FIG. 10—shows a process flow for adjusting a system to network corrections;

FIG. 11—shows a diagram depicting the classification of network database changes.

Figure 12:
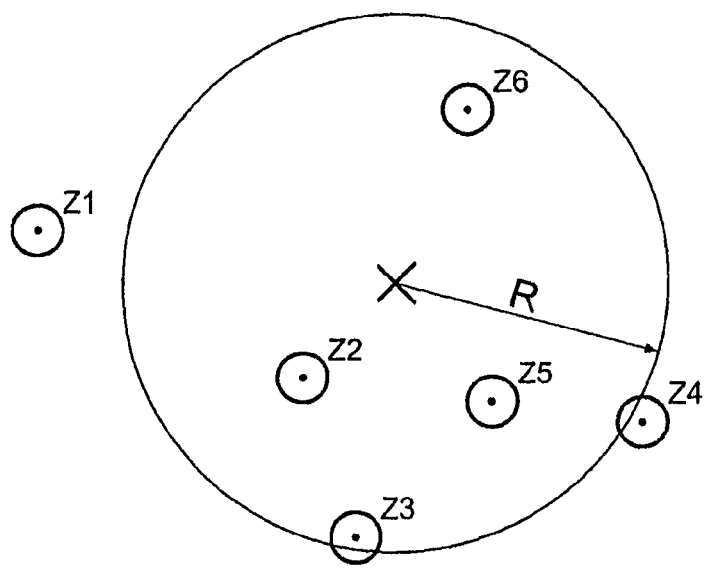
Figure 13:
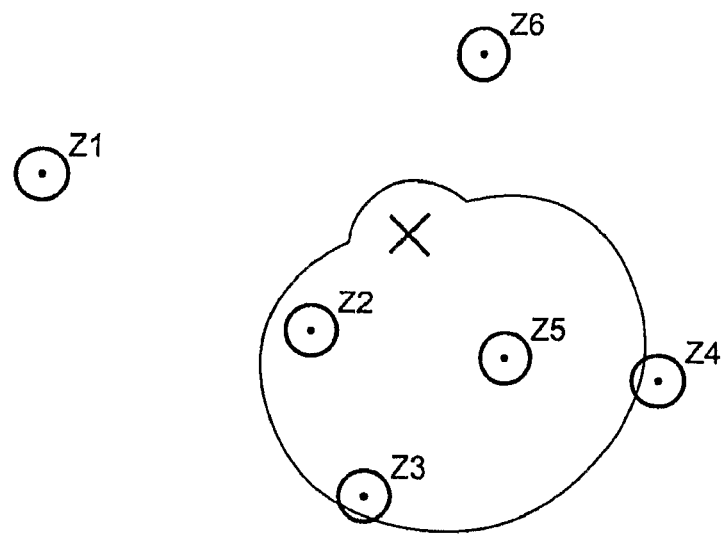
Figure 14:
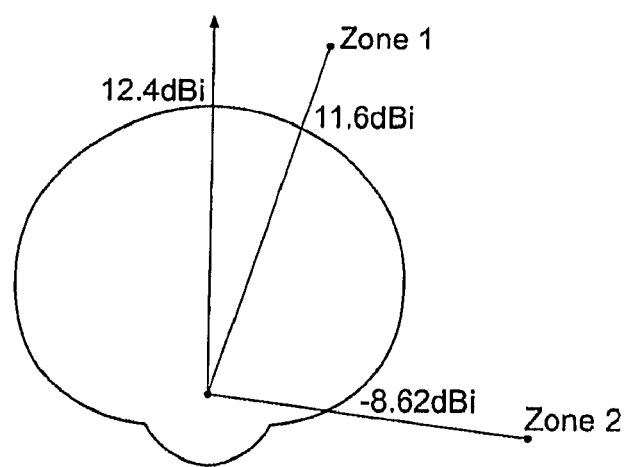
Figure 15:
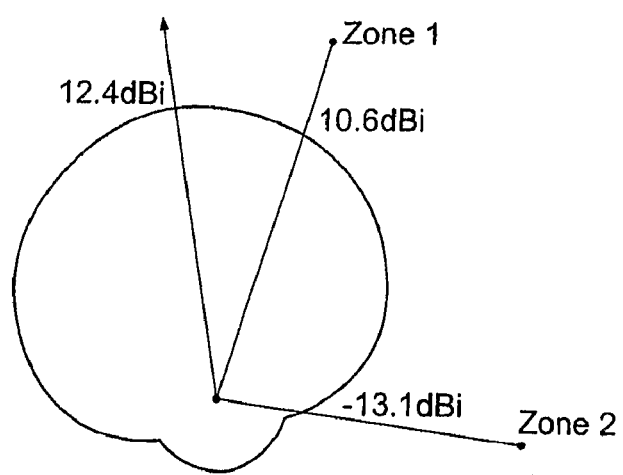
Figure 16:
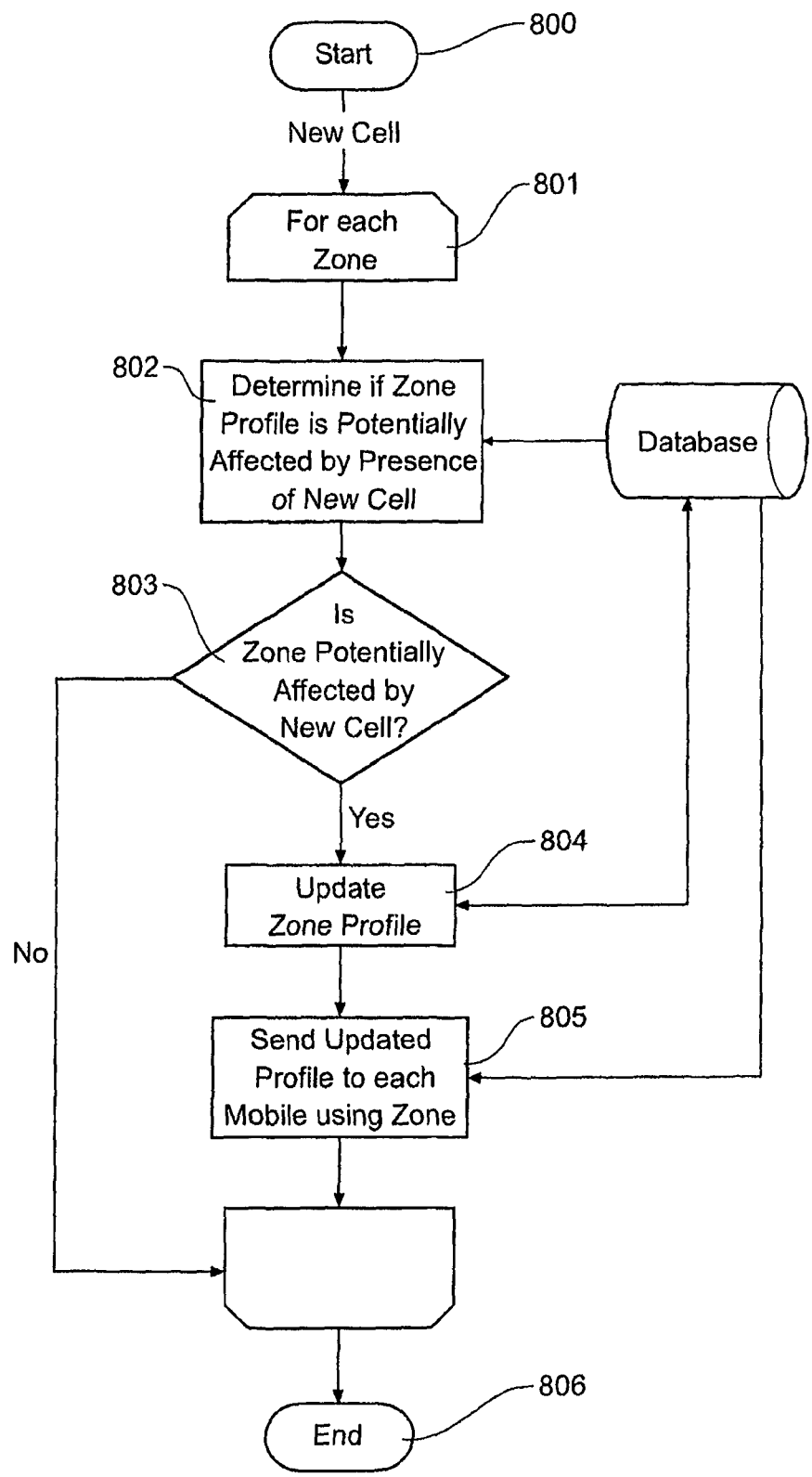

FIG. 12—shows a radial search for zones potentially affected by a given cell;

FIG. 13—shows a search based on signal propagation modeling for zones potentially affected by a given cell;

FIG. 14—shows an antenna orientation and gain pattern before antenna reorientation;

FIG. 15—shows an antenna Orientation and gain pattern after antenna reorientation; and FIG. 16—shows a process flow chart for updating a zone in the presence of a new cell.

DETAILED DESCRIPTION

The present invention will now be described in detail with reference to one or more embodiments of the invention, examples of which are illustrated in the accompanying drawings. The examples and embodiments are provided by way of explanation only and are not to be taken as limiting to the scope of the invention. Furthermore, features illustrated or described as part of one embodiment may be used with one or more other embodiments to provide a further new combination.

Although many of the examples used to illustrate the embodiments of the present inventions are based on the GSM mobile phone system, the embodiments disclosed herein are readily applied to other mobile phone systems such as UMTS, CDMA-2000, and CDMA IS-95. This is because the parameters being measured and the corresponding cell characteristics have equivalents in each of the mobile phone technologies. For example, a GSM signal strength measurement can be used in the same way as a CDMA-2000 pilot power measurement. As another example, just as the absence of a cell from a GSM Network Measurement Report may indicate a non operational cell, the absence of a particular UMTS Node B from a set of intra frequency measurements may also indicate a non-operational cell.

It will be understood that the present invention will cover these variations and embodiments as well as variations and modifications that would be understood by the person of ordinary skill in the art.

It will be understood that the present invention will cover these variations and embodiments as well as variations and modifications that would be understood by the person of ordinary skill in the art.

Throughout this specification, the term "mobile" or "mobile phone" is used synonymously with terms such as "cell phones" or "mobile radio terminal", and will be understood to encompass any kind of mobile radio terminal such as a cell phone, Personal Digital Assistant (PDA), lap top or other mobile computer, or pager. Similarly the terms cell is used synonymously with the term cell.

Throughout this specification the term "location system" is used in its most general sense referring to systems that output location estimates with respect to an object or coordinate frame and to systems that output the location estimate as an indication of the proximity to an object or an area. The latter includes but is not limited to zone-based location systems such as that described in PCT/AU2006/000478.

The term "about" as used herein may be applied to modify any quantitative representation that could be permissively varied without resulting in a change in the basic function to which it is related.

In the following description, when processing is described as being carried out in a mobile terminal, it will be understood that the processing could be carried out in the handset, in the Subscriber Identification Module (SIM) that is inserted in the handset, in an additional processing or smart card inserted into the handset, or in a combination of two or more of these.

In this specification, use of the term network configuration refers to the as deployed network and where relevant also includes the operational state of each component of the network.

It will also be understood that much of the processing that occurs in the implementation of various aspects of the present invention can also be distributed between the handset, one or more network elements within the radio communications network and/or one or more elements outside the radio communications network. It will also be understood that the invention may be applied to any application in which a location estimate for a mobile terminal is required.

Throughout this specification, various headings are provided solely for the purpose of assisting the reader in understanding the various aspects of the present invention described herein. In no way are the headings intended to, nor should the headings be construed, to limit any aspect of the scope of the various aspects of the present invention.

While the following description uses location and zone based systems to exemplify the operation of the invention, it will be appreciated that the invention is not limited to such applications. The methods described are equally useful for other systems in which a radio network configuration database is maintained as will be understood by one of ordinary skill in the art. One example is the primary operation of the mobile network in providing voice and data communications where problems with the network configuration degrade the quality of service and/or coverage.

A co-pending PCT patent application entitled "Detection In Mobile Service Maintenance", describes various methods for detecting inconsistencies between configured mobile radio communications systems and a network database representing the network. Once these inconsistencies are detected, there are various methods of dealing with that information.

When a network configuration is updated, the network operator can pass to the location system information about the updates so made. The network operator may also provide to the location system information pertaining to corrections to information previously provide but which was in error. Once these changes are provided, there are various methods of dealing with that information.

The present application is concerned with these methods and applications.

Managing Network Inconsistencies

The term 'inconsistency' is used to mean any difference between the actual network configuration and the representation of the network in the network. An inconsistency can include, but is not limited to, an absence of in the database of a network element that is in the actual network, the presence of a network element in the database that is not in the actual network, and/or a variation in a value of a network parameter in the database from that of the actual database.

When an inconsistency has been detected by the system, the problem needs to be resolved. An aspect of this invention is the use of the methods described in the following sections to resolve, temporarily or permanently, the issues that caused an inconsistency between the configured network and the network database. The methods described can be used independently and/or in combination in any order. The methods described apply to all network detected inconsistencies although the specific details of some of the functions with the method will vary according to the nature of the inconsistency. Such functions are described elsewhere within this specification.

Direct Notification

One mechanism for discovering changes made to the network or corrections required for the database is via direct notification by the network operator 40. The network operator 40 may provide such information to the location system 30 in response to events that include but are not limited to: the configuration of the network 10 being modified, errors being discovered in the network database 50, and an inconsistency being detected and reported to the operator. The network operator 40 is providing the data to ensure that the network database 30 accurately reflects the current configuration of the network 10 and to ensure that the performance of services dependent upon the network database 50 is not degraded due to otherwise avoidable database errors.

The detection methods described in the previously-mentioned co-pending PCT application, can detect inconsistencies between the as configured network 10 and the network database 50 but in many circumstances the root cause may not be readily identified by the location server 30. The location server 30 notifies the system operator 40 of the inconsistency. The network operator may then determine the root cause of the inconsistency, determine the necessary corrections and provide an network database update to the location server to compensate for the inconsistency. In certain situations it may be preferable to provide a temporary solution to the inconsistency while the root cause is being determined. Methods are described herein to support such temporary solutions.

The notification of database corrections or network configuration changes can be in the form of a new network database whereby the changes (cell additions, deletions, and parameter changes) can be determined by comparing it with the current database. Another option is for the network operator to provide a database delta that lists all of the changes to the network including the deletion and addition of cells. Furthermore, the network database update can include an indication of which changes are corrections and which are due to the network being reconfigured.

Detecting Inconsistencies and Informing System Operator

FIG. 1 illustrates a system architecture for detecting network inconsistencies in a mobile radio communications network 10, containing Base Transmitting stations 11, and in some aspects, reporting suspected inconsistencies to a network operator 40. Radio measurements of the network radio signals are made by a radio receiver, for example, a mobile radio terminal 20. In one aspect, these measurements are sent to a network processor such as Location Server 30, perhaps using the same mobile radio communications network of which the measurements were originally made. The Location Server 30 processes the measurements, compares them against the data stored in the network database 50 and if an inconsistency is detected it is passed onto the network operator 40 using one or more communication mechanisms.

FIG. 2 illustrates a general process flow for detecting inconsistencies and reporting such inconsistencies to the system operator. The process starts at step 100. At step 101, network measurements are obtained from the network, for example from one or more mobile radio terminals. In step 102, the obtained measurements are analysed and compared against the network database 50 to determine whether any inconsistencies exist. In another form, the network measurements may already have been analysed and one or more inconsistencies identified. In such cases, the report to the system could be details relating to the actual inconsistencies previously detected and now reported. The inconsistencies may be detected using one or more of the methods described in the previously-mentioned co-pending PCT patent application. In one form, the inconsistencies could be reported as soon as they are detected. In another form, the inconsistencies or measurements could be collated into a report that is generated and sent to the system operator at specified times or intervals. In a further form, the inconsistencies could be collated into a report that is generated and sent to the system operator when the number of inconsistencies detected exceeds a configured threshold.

In steps 103 and 104, if inconsistencies are detected, the system operator 40 is informed. The process ends at step 105.

The operator may then determine the root cause of the inconsistency and use the management interface (as described in more detail below) to provide updates and/or corrections to the database 50. As specified elsewhere in this specification, these updates to the network database may then be propagated to system elements affected by the changes, for example zone profiles in a zone-based location system.

Detecting Inconsistencies and Automatically Compensating

In another form of the invention, detected inconsistencies may be automatically compensated for, without involving a network operator.

FIG. 3 illustrates a system architecture for detecting network inconsistencies and automatically compensating for the inconsistency by updating each system element. Radio measurements of the network 10 radio signals are made by mobile radio terminal 20. These measurements are sent to the Location Server 30, perhaps using the same mobile radio network 10 of which the measurements were originally made. The Location Server 30 processes the measurements and compares them against the data stored in the database 50 as previously described. If an inconsistency is detected, the location server 30 determines which system elements are affected and appropriate compensation for the inconsistency so as to maintain service, albeit potentially degraded. The Location Server 30 then sends messages to each system element that is affected by the inconsistency with the determined compensation. In the particular example illustrated in FIG. 3, the system elements determined to be affected by the one or more inconsistency may be a plurality of mobile radio terminals 20, 20a, 20b and 20c. This includes the mobile radio terminal 20 that originally made the network measurements and reported these to the Location Server 30. In this particular example, mobile radio terminals 20, 20a, 20b and 20c may be a group associated with a particular zone defined by a series of network measurements. If there is an inconsistency in the network measurements and the database, this may affect various services associated with that zone. Accordingly, compensating data may be provided to each of the mobile radio terminals to compensate for the inconsistency. The various means and applications by which a plurality of users may be associated with a particular zone are described in detail in PCT/AU2006/001479.

FIG. 4 illustrates the process flow for detecting inconsistencies and automatically updating affected system elements to compensate for the inconsistency. The process starts at step 200, then at step 201 collects network measurements or already-detected inconsistencies and compares these against the network database 50 in step 202. If an inconsistency is detected in step 203, the system determines in step 204, which zone profiles within the zone-based location system are affected by the inconsistency. The method for making such a determination is described elsewhere in this specification. In step 205, the system compensates each affected zone for the inconsistency as previously described. In step 206, the system determines which users are affected by the updated zone profiles and in step 207, transmits the updated zone profile(s) to each affected user as previously described above and in the referred to pending PCT application. The method then ends at step 208.

One method of compensation is the application of an ignore flag as described in more detail below. For many of the inconsistencies identified, the system may not be able to identify the root cause behind the inconsistency and is thus may not be able to adapt in an appropriate manner. As such, a means of automatically compensating for the inconsistency is to apply the ignore flag to the affected cell or cells.

Finding Zones Affected by a Network Change

A network change is any change to the information pertaining to the network as required by the location system. Such a change may be as the result of an action taken by the location system in response to an inconsistency being detected. Such a change may be one of more updates provided by the operator due to the network configuration being updated and/or expanded. Such a change may be one or more corrections in response to there being errors in network data previously provided by the network operator.

FIG. 5 illustrates a process flow for detecting which zone profiles are affected by a change to the network database 50 or by an inconsistency. The process begins at step 300, and then obtains data relating to network changes in step 301. In steps 302 and 303, the process examines, for each cell within each zone profile, whether the cell's parameters within that profile are affected by the change or inconsistency. If the cell is affected and the change is deemed to be significant in step 305, then the associated zone profile is deemed to be affected by the change and is accordingly flagged for updating in step 306. In step 307, all flagged zone profiles are gathered for further processing, such as transmitting updated zone profiles to associated users of the zones as previously described. Processing efficiencies can thus be gained by combining the determination of affected zones with the update of the associated zone profiles.

In embodiments where there are aspects of the network database stored in the mobile radio terminals, then there is a trade-off between the cost of sending messages, for example SMSs, to each mobile radio terminal affected by a given change to address the change and the degradation to the performance of the location system had the change been ignored. If the impact on location system performance of a given change for a given mobile or zone profile is deemed to be tolerable, then the change is not significant.

Any change to the identifiers associated with a cell are deemed significant.

A change that affects the received signal strength of a cell is deemed significant if the received signal strength change exceeds a threshold. The threshold could be set in the range of for example, about 0 dB to 9 dB, about 0.5 dB to about 4 dB, or about 1 dB to about 6 dB.

A change that affects a timing measurement is deemed significant if the received signal strength change exceeds a threshold. The threshold could be set in the range about 0 m to about 1000 m, about 10 m to about 50 m, about 20 m to about 100 m, about 50 m to about 500 m, or about 200 m to about 1000 m.

The presence of a new cell is considered significant if the expected received signal strength for the cell exceeds a threshold. In GSM the threshold could be set in the range of, for example, about −110 dBm to about −80 dBm, about −105 dBm to-about −95 dBm, or about −100 dBm to about −90 dBm.

A deleted cell is considered significant if the received signal strength for the cell exceeds a threshold. In GSM the threshold could be set in the range of, for example, about −110 dBm to about −80 dBm, about −105 dBm to-about −95 dBm, or about −100 dBm to about −90 dBm.

It is possible that a set of network changes could result in there being more than one change for a given mobile or zone profile. In such circumstances the definition of what is a significant change can be altered such that all changes will be deemed significant if the number of changes deemed significant on a per cell basis exceeds a threshold. For example if there are two changes to a zone profile but both are deemed insignificant, the combination is deemed significant. The threshold could be set at about 2 to about 20 insignificant changes. The threshold could also be set in some embodiments at 2, 3, 4, 5, 6, 7, 8, 9, or 10 insignificant changes.

When a network change is not propagated to a system element, the change can optionally be stored in the central server as a delta to the baseline as stored in the mobile. Subsequent changes are then evaluated against the baseline as stored in the mobile and the decision regarding significance is made against the baseline. This avoids a series of small insignificant changes from being accumulated and ignored when the total of all changes is deemed significant. Further at any time when a message is required to be sent to the mobile, all outstanding changes are sent as facilitated by the storage of the deltas.

In embodiments where all network related information is stored centrally there is minimal cost associated with propagating changes to each system element. As such the significance of a given change on a given mobile or zone profile does not have to be considered. All changes are simply processed and distributed as required.

Finding Zones Affected by a Network Change Using Simulation

FIG. 6 illustrates another process flow for detecting which zone profiles are affected by a change to the network database or an inconsistency. The process is similar to that illustrated in FIG. 5 with the exception that the process includes the wider effects of a network change, in particular changes that arise from a network retune. The nature of frequency reuse and multiple frequency channels in mobile networks means that interference is an issue. Whenever there is a change to the network the cells that are hearable at a given location may change. In this aspect of the invention the process evaluates the impact of all cells on a zone and not just those that are already defined within a given zone profile. It is also possible for the process to evaluate the impact of a subset of all cells on a zone. Typically the subset is determined as those cells that lie within a configured distance of the zone. This configured distance may vary depending on the density of the cells sites within the system in the vicinity of the zone. One such method for determining a distance that varies in proportion to the density of the cells is the multiple of the median distance to neighbouring cells described in the previously-mentioned co-pending PCT patent dealing with detecting inconsistencies. These approaches have the advantage of discovering cells that may become hearable within a zone as a result of the change or the converse where a previously hearable cell is unable to be heard.

Starting from step 400, the process obtains information relating to network changes in step 401. In steps 402 and 403, for each zone, the process simulates signal reception in the zone for all cells in the vicinity of the zone. In steps 404 and 405, for each cell in the vicinity of the zone, the process determines the effect of the changes to the cell profile parameters. In step 406, a determination is made as to whether the cell is significantly affected by the change. If so, the zone is flagged for subsequent update in step 407. If not, no action is taken. In step 408, all flagged zones are gathered for subsequent action. The process ends at step 409.

Updating System Due to Network Changes

FIG. 7 illustrates a system architecture for updating the system due to network changes. The architecture is the same irrespective of whether the changes are corrections or updates to the network database. The network operator, either manually or via an automated system, provides changes to the network 10 to the Location Server 30. The Location Server 30 analyses the network changes and by combining this analysis with data from the database 50, determines which system elements, in this example, mobile radio terminals 20, 20a and 20b, are affected by the change and what correction(s) need to be sent to each such system element. One or more network update messages are then sent to each such system element via the radio network 10. The network operator 40 may or may not be involved in this process as previously described.

Updating Zone Profiles

Zone profiles may require updating whenever there is a change to the network. The changes can be any combination of network updates or corrections provided by the operator 40, application parameters such as the application or clearing of the ignore flag by the operator or automatically by the system, the addition or deletion of cells, or any other change that leads to a profile being updated as detailed within this specification.

FIG. 8 illustrates a process for updating zone profiles within a system based on a change. The process works through each zone profile to determine the effect of the changes on the profile. If there are changes that are determined to affect on the zone detection performance, the profile may be updated. The decision to update the profile is then based upon the significance of the effect and the system architecture as discussed herein.

The changes are evaluated against every cell in each profile to determine if the change affects a cell identifier, a signal strength parameter or an application parameter and apply an update if there is a change. The methods for determining what the effect of a change is on a given profile parameter are discussed in detail herein.

Within the process there are a number of decision points. It should be clear that the process can be simplified by ignoring some of the decision points. By assuming that the network changes are not likely to make any significant changes to the hearability of cells within a zone, the process can be modified to evaluate only those cells that are already in each zone profile plus those cells that are new. This has the advantage of reducing the number of cells that have to be evaluated.

As discussed elsewhere in this specification, what changes need to be made to a given profile parameter will vary depending upon the nature of the change; whether it is an update or a correction. The majority of changes would be expected to be updates and in the absence of any indication otherwise, a change is assumed to be an update.

The process illustrated in FIG. 8 begins from step 500. In steps 501, 502 and 503, for each cell in each zone affected by the change, a determination is made as to the effect of the change on that cell and zone. In step 504, a check is made to see if that cell is in the profile of the zone. If so, in step 505, a check is made to see if the cell has been deleted. If so, the cell is removed from the profile at step 509 and then proceeds to step 516 described below. If the cell is determined not to be in the profile in step 504, the hearability of the cell is evaluated in step 506. If the cell is hearable, then the cell is added to the profile (steps 507 and 508) and proceeds to step 616 described below. If the cell is not hearable, then the process immediately proceeds to step 516.

If the cell has been determined not to be deleted in step 505, a determination is made to determine whether the cell is affected by an identifier change in step 510. If so, the cell identifiers are updated in that profile in step 511, before proceeding to step 512. If not, the process proceeds immediately to step 512. In step 512, a determination is made as to whether the cell is affected by a signal level change. If so, the signal strength parameters are updated in the profile in step 513 before proceeding to step 514. If not, the process proceeds immediately to step 514. In step 514, a determination is made as to whether the cell is affected by a profile policy change. If so, the cell policy parameters are updated in the profile, in step 515. The process then proceeds to step 516 to evaluate the impact of all changes to the profile. If the impact is deemed to be significant in step 517, the profile is flagged as updated in step 518. In step 519, all profiles flagged as updated are found. The process then ends in step 520.

Adjusting System to Network Changes

FIG. 9 illustrates a process for adjusting the location system in response to network updates being provided. The process validates the changes to make sure that all changes are valid and updates the existing database based on the changes if they are valid. The process of validation is described herein.

The changes once validated, may then be propagated throughout the location system. The system determines which zones are affected and then updates the zone profile for each such zone. The process and methods for updating a zone profile are described herein.

The process illustrated in FIG. 9 begins from step 600. In step 601, network updates are obtained and checked against the network database 50. If the updates are deemed to be valid (discussed further herein) in step 602, the affected zones are located in step 603, and then updated in step 604. In step 605, the users affected by the updated zone profiles are located, with reference to database 50 and as previously described, and the updated zone profiles are then transmitted to the affected users in step 606. The process then ends in step 607.

FIG. 10 illustrates a process for adjusting the location system in response to network corrections being provided. The process validates the corrections to make sure that all corrections are valid and updates the existing database based on the changes if they are valid. The process of validation is described in detail herein.

The corrections once validated, may then be propagated throughout the location system. The system determines which zones are affected and then updates the zone profile for each such zone. The process and methods for updating a zone profile due to corrections are described herein.

The process of FIG. 10 begins from step 700. In step 701, network corrections are obtained and reference is made to the database. In step 702, a determination is made as to whether the corrections are valid, as will be described in more detail further below. If the corrections are deemed to be valid, the affected zones are located in step 703, and the affected zone profiles updated in step 704. In step 705, the users affected by the updated zone profiles are located with reference to the database, and the updated zone profiles are then transmitted to the located users in step 706. The process then ends in step 707.

Detecting Cells Returning to Operational State

If a mobile radio terminal has been informed by the system that a given cell is non-operational or to be ignored, then the mobile radio terminal is able to react once the cell becomes operational again. One mechanism for informing the mobile radio terminal that a cell is non-operational is to use the ignore flag. When processing cell measurements, the mobile radio terminal can check to see if any of the heard cells matches a non-operational cell. In one aspect of this invention, if such a cell is detected then the mobile radio terminal can take action to reset the ignore flag. In another aspect of the invention, the mobile radio terminal can inform the server that it has detected a non-operational/ignored cell transmitting.

Table 1 shows a zone radio profile. In effect, this is a subset of the system database 50. The cell 25068 has been flagged to be ignored. The cell has also been flagged to allow the ignore status to be overridden. Table 2 shows a set of measurements of the cell. The serving cell is a cell known to the mobile given its subset of the overall network database. The mobile radio terminal is able to resolve the identity of some of the reported cells based on the data within the zone radio profile. The zone radio profile data pertains to data obtained from the same location and thus it can resolve then unique cell identity based on the partial identifier. The cell with ARFCN 74 and BSIC 48 cannot be uniquely identified as the mobile terminal has no match for such a cell. The cell with ARFCN 95 and BSIC 38 is matched to cell 25068. This cell is also flagged to be ignored. The mobile has been informed that it has permission to override the ignore flag once the cell has been detected. The measurement represents such a detection and thus the ignore flag is cleared and the cell is again included when determining zone status. Optionally the permission to ignore the ignore flag is also cleared as the reason for allowing the ignore flag to be automatically cleared by the mobile is dependent upon the reason for the cell being flagged to be ignored in the first place. For example the cell may be transmitting to test the base station hardware but not actually be available for service and could soon be turned off again. In such a case the mobile would have been informed to ignore the cell but not given permission to reset the ignore flag.

TABLE 1

| Cell ID | ARFCN | BSIC | RxLev Mean | Sigma | Ignore | Ignore Overide OK |
|---------|-------|------|------------|-------|--------|-------------------|
| 25068   | 95    | 38   | −60.0      | 9     | 1      | 1                 |
| 54763   | 81    | 59   | −88.3      | 9     | 0      | 0                 |
| 18322   | 67    | 46   | −92.1      | 9     | 0      | 0                 |
| 892     | 71    | 61   | −98.7      | 9     | 0      | 0                 |
| 18581   | 73    | 34   | −103       | 9     | 0      | 0                 |

TABLE 2

| Cell ID | ARFCN   | BSIC    | RxLev Mean(dBm) |
|---------|---------|---------|-----------------|
| 54763   | Unknown | Unknown | −75.0           |
| Unknown | 95      | 38      | −80.0           |
| Unknown | 61      | 61      | −93.0           |
| Unknown | 74      | 48      | −98.0           |
| Unknown | 73      | 34      | −100.0          |

Network Database Validation

When a network database 50 is supplied to a location system by the network operator 40, the system can optionally validate the database to flag errors and potential inconsistencies in advance of installing the database into the location system and propagating subsets of that database to various system elements including mobile radio terminals 20.

The validation process may include a feature to check that all cell coordinates lie within a boundary specified for the network. The validation process may include a feature to check that for each cell the distance its nearest neighbour does not exceed a specified distance. The validation process may include a feature to check that all cells listed as being at a common installation site are not too far apart, for example within 200 m.

The validation process may include a feature to check that all cell frequencies are within the set available to the network operator according to their radio licence(s). The validation process may include a feature to check that all parameters lie within the ranges specified for that parameter. This especially applies to parameters that have ranges specified within the communications standards as will be understood by the person skilled in the art. The validation process may include a feature to check that all cells listed as being at a common installation site have sensible antenna azimuths and antenna beamwidths. For example if there are three cells at an installation, the beamwidths would be expected to be approximately 60 degrees and the azimuths approximately 120 degrees apart. The validation process may include a feature to use a radio propagation simulations check for co-channel, adjacent channel, and alternate channel interference that could indicate a database error. The validation process may include a feature to check for problems with frequency and partial identifier reuse. In general the reuse of frequency and partial identifier combinations, for example ARFCN+BSIC in GSM, is such that within the vicinity of a given cell a given combination is only used once. A simple implementation is to define the vicinity of a cell to be a configured radius around the cell's coordinates. The validation process may include a feature to generate the set of differences between the supplied network database with the currently installed network database. Differences can include cells added, cells deleted, frequency changes, identity changes, transmission power changes, antenna azimuth changes, and antenna height changes. The validation process may include a feature to report on the number of system elements that will be have to be updated as a result of the differences between the supplied network database and the currently installed database. The validation process may distinguish between updates and corrections.

Network Management Interface

In one aspect of this invention there is provided a management interface to enable the system operator to manage the network update process. The management interface provides a combination of one or more of the following features.

- A facility to load a new network database: Optionally the database contains an indication of which changes are corrections and which are updates. Optionally the facility provides separate mechanisms to load network updates and network corrections.
- A facility to load a set of network database changes: Optionally the set of changes contain an indication of which changes are corrections and which are updates. Optionally the facility provides separate mechanisms to load network updates and network corrections.
- A facility to enable the system operator to add new one or more cells to the system.
- A facility to enable the operator to set the "ignore" flag on a cell: This can be used on new cells where there is not sufficient information available for the cell to be enabled in the location computation. This can be used for cells that are currently not operating.
- A facility to enable the operator to clear the "ignore" flag on a cell.
- A facility to enable the operator to set the "ignore" flag on a cell for specified system elements.
- A facility to enable the operator to clear the "ignore" flag on a cell for specified system elements.
- A facility to enable the system operator to delete one or more cells to the system.
- A facility to enable the system operator to set the date and time at which changes to the network database are to be made active. A date and time can be specified for the all changes or a separate date and time for each change. Changes include but are not limited to changes to cell parameters, adding cells removing cells, and setting and clearing the "ignore" flag. This facility enables changes to be pre-planned and synchronised with the planned time at which network changes will take effect.
- A facility to enable the system operator to set the date and time at which changes previously made to the network database are to be made reversed.
- A facility to enable the system operator to specify that the location system is permitted to automatically determine when the ignore flag can be turned off. In the case of an unplanned cell outage and to a lesser extent for planned maintenance, the time at which a cell will be once again operation is not known in advance. Rather than wait to be told the cell is back on and then use the maintenance interface to re-enable the cell in the location system by turning off the "ignore" flag, the system can be given permission to automatically turn off the "ignore" flag as soon as the cell is detected. The operator could choose to combine this facility with a stop time or manual reset to ensure that no profiles retain the "ignore" flag as being set.
- A report of outstanding inconsistencies between the network database and actual configuration as detected by the location system. The report could include but is not limited to, showing for each cell the current state of the system and the new state enabling a skilled operator to spot possible mistakes in the suggested changes. In the case where inconsistencies have been detected via measurements of the network, the report can also include a summary of the inconsistencies such as the total number of observations of the inconsistency over a specified time period. It can also include specific details for one or more sets of measurements that revealed the inconsistency such as the time, approximate location, serving cell ID, and measurement data.

This report can be generated automatically, for example once per day or once per shift, in response to a manual request or triggered by a detected change in the network.

- A facility to select the content of the aforementioned report and the times at which the report is generated. The facility will also provide for the report to be generated immediately upon request.
- A facility to drill-down from a summary of the reported inconsistencies to reveal the details of the measurement(s) that led to the reporting of the inconsistency.
- A facility to optionally require the system operator to approve any network changes before they are propagated to system elements. This enables the operator to stop the propagation of any change for which the operator may feel is incorrect. This step is of particular value when the proposed changes have been automatically generated by the system. It can also be used when the changes are detected by differencing the current network database with the new network database as a detected change may be an error in the new database that a skilled operator could detect.
- A facility to apply adjustments to system elements to compensate for changes to radio propagation as a result of seasonal variation.

Updating System Elements

The system needs to update system elements in response to a network update, network corrections, or a change in the application behaviour. The change may be driven by the system operator or an automatic response based on the detection of an inconsistency. In the case of a zone-based location system the system elements that need to be updated are the zone profiles that define the zone.

Classifying Network Changes

FIG. 11 illustrates the classification of network database changes. The classification of a given change affects how the change will be processed and what changes will be made to location system elements.

Network database changes are classified as either updates or corrections. Updates represent changes to the network configuration that have been reflected in an updated network database. Corrections represent mistakes present in the network database such that the originally provided network database did not reflect the actual network configuration.

The changes are also classified as being temporary or permanent. Permanent changes reflect a permanent change to the actual network configuration or a correction to the network database in response to a mistake being discovered. Temporary changes arise from a range of circumstances. Examples of such changes include cells that are temporarily non-operational due to failure of planned maintenance, temporary cells installed to provide a short term increase in capacity and/or coverage, and temporary database changes to compensate for a network configuration inconsistency for which the root cause has not been identified. Permanent changes represent updates due to network configuration changes and corrections for mistakes in the network database. Permanent changes representing updates to the network configuration are expected to be the vast majority of network database changes.

Any given network database change to an existing cell can relate to cell identifiers, unique and non-unique, or to parameters that affect signal hearability or both. Cell identifiers are those parameters that are unchanged no matter where they are observed. Changes to cell identifiers require that the change be made to any system element that is affected by the change. Signal hearability parameters are those that affect the signal level expected at a given location and the ability to hear the signal at a given location. Changes to parameters that affect signal hearability require that any signal propagation observable, such as time-of-arrival or signal strength, be compensated for on a per location basis. Parameters that affect signal hearability include antenna azimuth, antenna downtilt, antenna height, antenna (cell) location, and transmit power. Changes to parameters that affect signal hearability can be dealt with simply by considering only the effect that a given change has on the reception of that signal. For example if a cell transmit power is increased by 3 dB then the expected signal strength at any location will be increased by 3 dB. A more accurate method to determine the effect of a change is to consider the other radio signals in the same radio channel and adjacent channels within the vicinity of the updated cell. Using the same example, an increase in power level will increase the interference to other cells in the same channel and in adjacent channels. At a given location this increase in interference may make another cell unhearable. Conversely the increase in power makes the cell hearable at a given location whereas previously the cell was not hearable. Changes to the Cell ID, partial identifiers (e.g. BSIC in GSM), and transmission frequency affect the signal identity. It will be clear to those of ordinary skill in the art that to a first approximation identity changes can be considered as independent from those affecting signal hearability. If the more accurate method discussed above is employed then some parameters changes will affect cell identity and signal hearability. In particular the radio channel, that is transmission frequency, is a non-unique identifier and also affects signal hearability.

The addition of cells to the network requires that the effect of the new cell be determined and affected system elements to be temporarily or permanently updated with the new cell. A cell may be non-operational because of failure, planned maintenance or because the cell has been decommissioned. System elements that reference the affected cell need to be updated.

A further type of change is the modification of application attributes associated with a cell. Examples of such attributes include the ignore flag described elsewhere in this specification; expiration times associated with a cell or application parameter, and the short ID ambiguity flag as described in PCT/AU2006/000478.

Determining Affected Zones

Network database updates and corrections need to be propagated to system elements, for example zone profiles, which are affected by the changes to the cell or cells. The first step is to determine which system elements are affected.

In certain embodiments each system element is evaluated to determine if a change to a given cell has affected that system element. In other embodiments a coarser evaluation process is first used to determine those system elements that are potentially affected by the change to a given cell, and then each of those system elements is evaluated to determine if a change to that given cell has affected that system element. This has the advantage of minimizing the computation overhead in those embodiments where evaluating the effect of a given cell change on each system element is computationally complex. An example of a coarser evaluation process would be to determine those system elements that lie within a specified radius of a new or modified cell as shown in FIG. 12. The radius represents the expected maximum range of the new or modified cell given the network configuration and an allowance for any uncertainty of the location of the system element. That radius will vary from about 50 m to about 50 km, from about 50 m to 35 km, from about 100 m to about 1000 m, from about 500 m to about 3000 m, or from about 2000 m to about 10000 m. In certain embodiments it may be desirable to treat the radius as a constant across the entire network or some portions thereof, in other embodiments it may be desirable to treat the radius on a per cell basis, and in yet other embodiments it may be desirable to treat the radius as a combination of the above. For example if a cell has an expected maximum range of 5000 m and the zone locations are accurate to 500 m then the search radius for system elements affected by a new cell would be at least 5500 m.

FIG. 13 illustrates the search technique where the system elements are radio profiles defining spatial zones. The zones are labeled Z1 to Z6. The nominal locations of the zones are labeled by a black dot. The search found zones Z2, Z3, Z5 and Z6 to be within a distance R of the cell.

A method for determining which zones are affected by a given network change is to use a radio propagation model to determine whether a new or changed cell is hearable at the location of a given system element as shown in FIG. 13. Such propagation models, such as Hata section 2.7 of Mobile Radio Communications $2^{nd}$ Ed. Editors Steele and Hanzo. ISBN 047197806 X, J. Wiley & Sons Ltd, 1999 are well known in the art. A given cell is expected to be hearable at the location of a given system element if the estimated received signal level is above the noise floor for the receiver, and if interference is also included in the model, is sufficiently higher than the sum of all interferers. As disclosed in PCT/AU2006/001479, a system element such as a zone profile can have a location associated with it or using measurements made at the system element have a location estimate computed for the system element. Such locations, whether provided or computed, may be inaccurate to varying degrees. This may affect the hearability of a given cell due to effects such as the system element may be further away from the cell in question or being closer to an interference source. In certain embodiments the detection criteria are modified to compensate for the location uncertainty. One such compensation means is to lower the receiver noise floor threshold thus potentially deeming a cell to be potentially hearable whereas it was previously deemed below the noise floor. The compensation would be to lower the noise floor in the range of about 0 dBm to about 10 dBm, about 0 dBm to about 2 dBm, about 1 dBm to about 3 dBms, or 2 dBm to about 6 dBm.

FIG. 13 illustrates a search technique where the system elements are radio profiles defining spatial zones. The zones are labeled Z1 to Z6. The nominal locations of the zones are labeled by a black dot. A radio simulation determines the boundary within which the cell can be heard. The search found zones Z2, Z3, and Z5 to be within the radio coverage footprint of the cell.

As described in the co-filed and patent application describing detection methods, messages from the mobile to the server, for example zone status update messages, may have radio data combined with the zone status update. Zone status update messages that represent a transition from in to out or vice versa for a given zone provide radio data representative of the zone. Following a change to the network the Location Server may analyze this radio data and determine if the network changes have had any impact on the zone profile. The Location Server may determine that if a new cell has been included in the radio measurements the zone profile is affected by that new cell. The Location Server may determine that if a cell not previously heard in the zone has been included in the radio measurements the zone profile is affected by one or more changes that resulted in the cell becoming hearable. By accumulating radio data for a given zone the Location Server may determine a given cell included in the zone profile is no longer hearable in the zone due to one or more network changes. This data accumulation can be achieved by using the technique disclosed in the co-filed patent application for detecting non-operational cells but limiting the data examined to that pertaining to a specific zone profile. Optionally the Location Server may only analyze data pertaining to those zone profiles that have been determined to be potentially affected by a change as determined using a coarse technique as described herein and the process above then used to refine the search.

Existing Cells

In certain embodiments where a network change directly affects a cell that already exists in the network database, the system elements affected by the cell parameter changes are determined by searching the network database for those system elements that reference the changed cell.

In certain embodiments where a network change to a cell that already exists in the network database may affect the signal level received by system elements, the system elements so affected are determined by using a simulation of the radio network to determine which system elements are affected by the change.

Such network changes include but are not limited to the decommissioning of a cell as the removal of a cell may permit previously interfered signals to be detected at a given system element. Other changes that may affect the received signal level include nut are not limited to frequency, antenna parameters, and transmit power. Optionally the simulation may only consider the cells that are referenced in the system element. Optionally the system may archive parameters associated with a cell that is no longer hearable at a given system element to facilitate the reinstallation of a cell in a given profile should a later change result in the cell once again being hearable.

TABLE 3

| Cell ID | ARFCN | BSIC | RxLev Mean | Sigma |
|---------|-------|------|------------|-------|
| 25068   | 95    | 38   | −60.0      | 9     |
| 54763   | 81    | 59   | −88.3      | 9     |
| 18322   | 67    | 46   | −92.1      | 9     |
| 892     | 71    | 61   | −98.7      | 9     |
| 18581   | 73    | 34   | −103       | 9     |

The process of determining which system elements are affected by a change to a cell is illustrated in the following examples in which the system element is a GSM zone profile. A network change has resulted in the cell ID 54763 being changed to 33932. Affected zone profiles are determined by searching the system, database for any zone profile that includes cell ID 54763. In Table 3 above illustrates one such zone profile that would be found by the process.

In another example the ARFCN and BSIC of cell 892 are changed. The new ARFCN is 76, the new BSIC is 18. Again the set of existing zone profiles is searched for those referencing cell ID 892 to determine the set of zone profiles affected by this change.

In yet another example the transmit power of cell 18322 is reduced by 3 dBm. Again the set of existing zone profiles is searched for those referencing cell ID 18332 to determine the set of zone profiles affected by this change.

In certain embodiments of the present invention the cell identity changes are treated independently from those parameters that affect signal strength. The system elements affected by a cell identity change are determined by searching the data associated with the system element for those elements that reference a changed cell.

The changes that affect the received signal strength of an existing cell are determined. As such, identifying the affected cells may follow the same process of searching for zone profiles that reference the modified cell. The same process may be applied to decommissioned cells.

New Cells

The hearability and signal level of a new cell in a given zone will not be accurately known without measuring the signal within that zone. It is not necessarily desirable to have subscribers re-register a zone due to the inconvenience for the subscriber and the potential load on the system. An alternative to re-registering a zone is to use a radio propagation model to determine the system elements at which the new cell is likely to be heard.

Flagging Cells to be Ignored

In one aspect of the invention there is a mechanism to flag cells in the database and other system elements to be ignored. When a cell is flagged to be ignored, the location system does not include measurements from that cell in any location-related computation.

The "ignore" flag mechanism is useful for maintaining system performance in the presence of database-network inconsistencies. Once an inconsistency is detected the ignore flag can be applied to the affected cells until such time as the root cause has been identified and appropriate data obtained for any required update to the database or change to the network configuration. Thus the ignore flag provides a means of promptly dealing with issues without actually resolving the issue. An example is the detection by the location system of an unknown cell. As previously discussed this could be due a number of causes including the existence of a new cell or a typographical error in the database. Until the actual cause is identified, the data gathered about the "new" cell is used to create an entry in the network database and this entry is flagged to be ignored. The change is propagated to all affected system elements. Once the issue is resolved the entry in the database is removed.

TABLE 4

| Cell ID | ARFCN | BSIC | RxLev Mean | Sigma | Ignore |
|---------|-------|------|------------|-------|--------|
| 25068   | 95    | 38   | −60.0      | 9     | 0      |
| 54763   | 81    | 59   | −88.3      | 9     | 0      |
| 18322   | 67    | 46   | −92.1      | 9     | 0      |
| 892     | 71    | 61   | −98.7      | 9     | 0      |
| 18581   | 73    | 34   | −103       | 9     | 0      |

As an example of the use of the ignore flag consider the GSM zone profile shown in Table 4. An inconsistency is detected for cell ID 54763 and the ignore flag is to be applied to reduce the impact of the inconsistency until it can be properly resolved. Table 5 illustrates the profile so modified.

TABLE 5

| Cell ID | ARFCN | BSIC | RxLev Mean | Sigma | Ignore |
|---------|-------|------|------------|-------|--------|
| 25068   | 95    | 38   | −60.0      | 9     | 0      |
| 54763   | 81    | 59   | −88.3      | 9     | 1      |
| 18322   | 67    | 46   | −92.1      | 9     | 0      |
| 892     | 71    | 61   | −98.7      | 9     | 0      |
| 18581   | 73    | 34   | −103       | 9     | 0      |

The "ignore" flag mechanism also has the advantage of being tolerant of time differences between the changes to the network database and network configuration. The "ignore" flag can be used to compensate for inconsistencies that can be anticipated but for which the short duration of the inconsistency or lack of information preclude a proper database update. The ignore flag can be scheduled to be applied in advance of an actual network configuration change and scheduled to be removed after the network configuration has been restored. For example when a cell is scheduled to be turned off for a period for scheduled maintenance, the precise time at which the cell will be turned off and back off again will not be known. The ignore flag is scheduled to be applied in advance of the earliest expect turn-off time and scheduled to be cleared after the latest expected turn on time.

Example uses of the ignore flag include temporary cells where the location of the cell may not be accurately known nor the precise times at which the cell will be commissioned and decommissioned; an inconsistency that has been detected but for which the information required to resolve the problem is not available; cells that are temporarily non-operational.

Using methods described PCT/AU2006/000478 the effect of the ignore flag can be approximated by assigning the cell a large sigma within the profile such that the cost associated with the cell is negligible. The values for sigma in this context may very from greater than about 10 dB, greater than about 15 dB, greater than about 25 dB, greater than about 40 dB, greater than about 60 dB.

Time-Triggered Actions

Updates to system elements can be configured to be triggered by time. In advance of a change to the network configuration the system can pre-determine the effect of the changes and have the changes applied at the specified time designed to coincide with the planned time at which the network configuration will be changed. An example of such a change to the system is the planned maintenance of a base station. The changes associated with the cell being non-operational can be applied automatically at the configured time and reversed at the time the base station is expected to return to operation.

Time triggers can also be used to reverse application parameters including the ignore flag and zone registration permission. For example the ignore flag, as discussed elsewhere in this specification, can be applied to a non-operational cell. Using the above example the ignore flag could be used for a cell that is under maintenance and the ignore flag configured to be reset after at a specified time. Another example is providing a subscriber with permission to register a zone within a given timeframe. The permission is automatically revoked at the pre-configured time.

Time triggers can be implemented in the mobile terminal or in the server. In the latter case the server would send a command to any mobile to effect any actions required at the mobile as a result of the trigger.

Event-Triggered Actions

The system can be configured to take specified actions upon detecting certain events in order to effect a change to maintain consistency of the network database as distributed throughout the system. Such events include the detection of a new cell, the detection of a non-operational cell returning to service, and the detection of a new cell when in a zone.

Upon detecting any inconsistency the system can take one or more of the following actions:

The system can inform the system operator that an inconsistency between the network as configured and the database as provided has been detected. The notification can optionally contain details of the nature of the inconsistency, for example new cell detected, and the details of the measurements that led to the inconsistency being detected.

The system can determine which zone profiles are affected by the inconsistency. For such zone profiles the affected cell(s) is flagged to be ignored and the updated profile sent to all mobiles reliant upon the zone profile.

One implementation is to employ both of the above whenever any type of inconsistency is detected.

These actions can be employed in response to any inconsistency. In addition to these actions the following sections detail further actions specific to the type of inconsistency. Such actions can be used in isolation or in combination with one or more of the above.

A zone based location system the system, upon detection of a new cell, can update potentially affected zone profiles to ignore the new cell. A zone based location system the system, upon detection of a new cell, can update potentially affected zone profiles to inform the server if the new cell is detected when the mobile is within that zone. Optionally the mobile can include measurements of the new cell such as received signal strength. This has the advantage of being able to accurately determine in which zones the new cell is hearable. The server can then implement one or more of the following actions:

The system can determine for which zone profiles the new cell is potentially hearable. To such zone profiles the new cell is added with the ignore flag set. Use of the ignore flag means that the system does not require accurate values for all of the parameters required for a zone profile.

The system can use the reported measurements or simulated measurements or a combination of both of the new cell, and optionally other cells, to generate a new radio profile for the zone and then send the new zone definition to all subscribers reliant upon the zone definition.

The system can give permission to one or more mobiles that use the zone to re-measure the zone and thus accurately capture the signal level for the new cell enabling a new zone profile to be generated and sent to all affected mobiles. This is the preferred option as it captures all of the effects of the changes to the network configuration.

If the mobile has detected the presence of a potentially unknown cell the mobile can apply add the cell to the affected zone profile based on the available measurements and apply the ignore flag to that cell. The mobile can inform the server of the detection. The mobile can override the zone status. These actions are not mutually exclusive and can be applied in any combination in any order.

Where a non-operational cell has been dealt with using the ignore flag, a location system can, upon detection that the cell is again operating can take one or more of the following actions:

The mobile upon detecting the cell operating can reset the ignore flag.

The mobile upon detecting the cell operating can inform the server.

The server can update all of the mobiles that have the cell flagged to be ignored.

Where an inconsistency pertaining to cell identifiers, unique and/or non-unique, has been detected the system can take one or more of the following actions:

The system can determine which zone profiles are affected by the inconsistency. For such zone profiles the affected cell(s) is flagged to be ignored and the updated profile sent to all mobiles reliant upon the zone profile.

If there is sufficient data on the changed parameters available from the network operations to automatically correct the inconsistency, the server can determine the affected zone profiles, update each zone profile and send the updated profile to each mobile reliant on each profile. For example if a cell with Cell ID 52415 is expected to be transmitting on ARFCN 28 but is heard on ARFCN 43, the server can update all zone profiles that reference Cell ID 52415 to change the ARFCN to 43. It should be clear to one of ordinary skill in the art to see how this can be applied to other cell identifiers in GSM and other radio access technologies such as CDMA (IS-95), UMTS, and CDMA-2000.

Updating Affected Zones

The following sections describe how zone profile definitions are updated due to network changes. There are many types of changes that can be made to a network and the impact of each of these on a zone profile is discussed in turn. Such changes to the network can be made in parallel. For example, a cell can have the transmit power level and the antenna downtilt changed at the same time; a GSM cell may have its BSIC and ARFCN change at the same time. It should be clear to those of ordinary skill in the art that the accumulated impact of a set of network changes on a given zone can be first determined and then a new zone profile send to each affected mobile phone. This has the advantage of minimizing the number of messages sent to a phone.

Dealing with Temporary Changes

There are scenarios in which there need to be temporary changes made to the network and hence the network database followed by propagation of changes to system elements. Such scenarios include but are not limited to, cells that have failed or are undergoing maintenance, and temporary placement of cells to support short-term capacity needs. There are also situations where a discrepancy between the network database and the actual configuration has been discovered or a network change made but for which the information required to update the database is not yet available in part or in full. The following sections detail methods for implementing a temporary fix for an inconsistency. The fixes can be applied automatically by the server as described elsewhere in this specification or manually by the system operator upon receiving notification or otherwise becoming aware of the inconsistency.

Reversing Changes

One means of dealing with temporary change is to make a change to the network database and propagate the changes to system elements and subsequently submitting another change to reverse the initial changes. If a cell is temporarily non-operational, the cell is removed from the database and propagated to all affected system elements. Once the cell is operating again the database is again updated with the deleted cell re-instated. This method requires that the data associated with the cell be archived such that it is available once it is required to be reinstated. If a cell has been prematurely removed from the database it can be reinstated in the database and the change propagated to all affected system elements. Once the cell's decommissioning has been confirmed the cell is removed from the database and propagated to all system elements. If a temporary cell has been installed the cell can be added to the database and the change propagated to all affected system elements. Once the need for the cell has passed and the cell turned off, it can be removed from the database and other affected system elements.

Flagging Cells to be Ignored

Not all types of network inconsistencies between the configuration and the database are readily resolved by propagating a change to the system elements and subsequently reversing or otherwise resolving the inconsistency at a later time. The inconsistent cells could be removed from the database and other system elements but they will still be operating in the network and would, from the perspective of the location system, just appear as though they were new cells. All that has happened is to transform the nature of the consequences and perhaps relocate the burden of those consequences. Further the system would also eventually report this new inconsistency.

Resolving an inconsistency via an update to the network database requires that the data to correct the inconsistency is available which in turn requires that the root cause of the problem has been identified and the correct change has been identified. Further when any change is made to the network database and propagated to affected system elements needs to coincide with the time at which the network configuration actually changed.

The use of the "ignore" flag applied to a non-operational cell is illustrated via a zone detection system based on the use of a zone profile. This example uses the profile defining a zone as shown in Table 6.

TABLE 6

| Cell ID | ARFCN | BSIC | RxLev Mean | Sigma |
|---------|-------|------|------------|-------|
| 25068   | 95    | 38   | −60.0      | 9     |
| 54763   | 81    | 59   | −88.3      | 9     |
| 18322   | 67    | 46   | −92.1      | 9     |
| 892     | 71    | 61   | −98.7      | 9     |
| 18581   | 73    | 34   | −103       | 9     |

In this example, a new set of measurements is available as illustrated in Table 7 below. The measurements have been made from within the zone for which the profile was defined. The ARFCN and BSIC are not available for the serving cell because they are not reported in the NMR data. Cell 25068 is not present in the measurement set as the cell is not currently transmitting.

TABLE 7

| Cell ID | ARFCN   | BSIC    | RxLev Mean(dBm) |
|---------|---------|---------|-----------------|
| 54763   | Unknown | Unknown | −83.0           |
| Unknown | 71      | 61      | −92             |
| Unknown | 67      | 46      | −99             |
| Unknown | 69      | 43      | −103            |
| Unknown | 73      | 34      | −103            |

The total cost is calculated as described in PCT/AU2006/000478, by summing the costs corresponding to the matched, unmatched and unreported cells. The calculated values for the matched cell costs are shown in Table 8 below, represented to 2 decimal places.

TABLE 8

| Cell ID | ARFCN | BSIC | Profile RxLev | Measured RxLev | Cost |
|---------|-------|------|---------------|----------------|------|
| 54763 | 81 | 59 | −88.3 | −83 | 0.17 |
| 892 | 71 | 61 | −92.1 | −92 | 0.00 |
| 18322 | 67 | 46 | −98.7 | −99 | 0.00 |
| 18581 | 73 | 34 | −103 | −103 | 0.00 |

The calculated value for the single unmatched cost is shown in Table 9 below.

TABLE 9

| Cell ID | ARFCN | BSIC | Measured RxLev | Threshold | Cost |
|---------|-------|------|----------------|-----------|------|
| Unknown | 69 | 43 | −103.3 | −105 | 0.02 |

In this example, since the measurement was not fully populated, using the methods described in PCT/AU2006/000347, an unreported threshold value of −105 is used. The calculated value for the unreported cell cost is shown in Table 10.

TABLE 10

| Cell ID | ARFCN | BSIC | Profile RxLev | Threshold | Cost |
|---------|-------|------|---------------|-----------|------|
| 25068 | 95 | 38 | −60.0 | −105 | 15.07 |

The cost of Cell 25068, the strongest cell in the profile, missing from the measurement set is quite high being 15.07 of a total cost of 15.26. In terms of deciding if the mobile is within a zone or not, the cost represents quite significant evidence that the mobile is not within the zone and depending upon the zone detection threshold, the mobile may be declared to be out of the zone. Declaring the mobile out of the zone because of a non-operational cell is not satisfactory. By applying the ignore flag to cell 25068 in the profile, the total cost of the measurement set is 0.19 and the mobile is clearly within the zone. Once the cell becomes operational the ignore flag can be reset enabling the zone detection operation and performance to return to normal.

Ignore Flag Used with an Unknown Cell

The use of the "ignore" flag applied to an unknown cell is illustrated via a zone detection system based on the use of a zone profile. This example uses the profile defining a zone as shown in Table 6 above. As discussed elsewhere in this specification the problem of an unknown cell being detected can manifest from a number of causes including a new cell becoming operational, cell identification parameters being changes and not correctly updated in the database, and a cell scheduled for decommissioning being prematurely removed from the network database.

In this example, a new set of measurements is available as illustrated in Table 11 below. The ARFCN and BSIC are not available for the serving cell because they are not reported in the NMR data.

TABLE 11

| Cell ID | ARFCN | BSIC | RxLev Mean(dBm) |
|---------|-------|------|------------------|
| 25068 | Unknown | Unknown | −70 |
| Unknown | 84 | 14 | −75 |

TABLE 11-continued

| Cell ID | ARFCN | BSIC | RxLev Mean(dBm) |
|---------|-------|------|------------------|
| Unknown | 81 | 59 | −83 |
| Unknown | 95 | 38 | −85 |
| Unknown | 71 | 61 | −92 |
| Unknown | 67 | 46 | −99 |
| Unknown | 73 | 34 | −103 |

Within the vicinity of the serving cell 25068 the system has not found any cell matching an ARFCN of 84 and a BSIC of 14. So there is an inconsistency between the network database and as configured network. In the meantime, since this cell is not matched to the profile the cost of hearing the unknown cell is 9.68 as shown in Table 12. This represents significant evidence that the mobile is not within the zone and will clearly impact the performance of the zone detection. Once the system has detected the presence of this unknown cell, the details of the cell can be added to each affected zone profile with the ignore flag set. Once the root cause for the inconsistency has been identified and the data required to update the system has been obtained, the affected profiles can be updated with the correct information and the temporary information covered by the ignore flag removed.

TABLE 12

| Cell ID | ARFCN | BSIC | Measured RxLev | Threshold | Cost |
|---------|-------|------|----------------|-----------|------|
| Unknown | 84 | 14 | −75 | −105 | 9.68 |

Differentiating Between Network Updates and Corrections

When updating the database and distributing changes to system elements it is preferable to have an indication associated with each change as to whether the change is a correction or an update. In an ideal network all changes would be updates reflecting recent changes to the network configuration. Experience has shown errors exist between the network database and actual network. Corrections are changes made in response to the detection of such errors. In both cases it is necessary to update the network database. Depending on the type of update and type of location system, it may not be desirable to update, automatically or otherwise, all system elements in response to a correction. Classifying the type of database update facilitates an improved network change process.

The following illustrates the difference between an update and a correction. In one example, there is a zone-based location system in which a zone has been defined based on actual measurements in the zone resulting in the profile given in Table 13 below. Subsequent to the zone's definition the network database is discovered to have the transmit power for cells 54763 and 18322 as −33 dBm when it should have been −30 dBm. This change would be flagged as a correction as the change is not associated with a change in physical configuration of the network. Since the profile entry for 54763 was based on actual measurements, the error in the database does not impact the profile entry and hence the change should not be propagated to this zone entry. Conversely the profile entry for cell 18322 was based on a predicted signal level. One parameter of the prediction will have been the transmit level. Since the level used was 3 dB too low, the RxLevMean profile entry for cell 18322 will be 3 dB too low. This profile entry should be updated.

In a different scenario in which a network retune has resulted in, amongst other changes, a real change to the transmit power for cells 54763 and 18322 from −30 dBm to −33 dBm, the database changes would be flagged as an update as both cells have actually changed and are now transmitting a signal 3 dBm weaker. As the change is real, and not an error, all zone profiles containing one or both cells should be updated. For the profile defined in Table 12, the RxLevMean for cells 54763 and 18322 would be changed to −91.3 dBm and −95.1 respectively.

TABLE 13

| Cell ID | ARFCN | BSIC | RxLev Mean | Sigma | Type |
|---|---|---|---|---|---|
| 25068 | 95 | 38 | −60.0 | 9 | Measured |
| 54763 | 81 | 59 | −88.3 | 9 | Measured |
| 18322 | 67 | 46 | −92.1 | 9 | Predicted |
| 892 | 71 | 61 | −98.7 | 9 | Measured |
| 18581 | 73 | 34 | −103 | 9 | Measured |

An application of this aspect of the invention to the different types of changes to a network is described in later sections of this specification.

Identity Changes Vs Signal Level Changes

Any given change, ignoring new cells and deleted cells, within and update to a network database can be classified as a change that affects a cell identifier or a change that affects the received signal level.

Changes that affect an identifier are readily updated as the existing data in each zone profile that references the cell simply has to be edited to reflect the change in the identifier. Such identifiers include the Cell ID, signal frequency and non-unique identifiers. For example a GSM network database has been updated as a result of a network retune. For cell ID 45241 the ARFCN (frequency) has changed from channel 32 to 53 and BSIC (non-unique identifier) from 53 to 16. Ignoring the possible effects of interference each zone profile that references cell 45241 is updated with the new ARFCN and BSIC.

Dealing with Permanent Changes

Typically the majority of changes to a network will be permanent changes. By permanent we mean that the changes that are expected to persist and reflect the state of the network. This contrasts to temporary changes where we mean that the change are expected to be relatively short-lived and either reversed or superseded by a permanent change. The techniques discussed herein for updating network elements due to permanent changes to the network can be used to deal with certain temporary changes whereby the change is reversed once the temporary condition ceases.

Changes to existing cells can generally be classified as a change that affects a cell identifier or a change that affects the received signal level. In the case of frequency and depending upon the radio network type, it may be considered as a cell identifier, as a parameter that affects the received signal level, or both.

Identifier Changes

Changes that affect an identifier are readily updated as the existing data in each zone profile that references the cell simply has to be edited to reflect the change in the identifier. Such identifiers include the Cell ID, signal frequency and non-unique identifiers.

For example a GSM network has been updated. One of the changes is that the cell with Cell ID 54763 now has Cell ID 33932. One of the radio profiles affected by the change is shown in Table 12. To compensate for the change, the zone profile is updated with the reference to cell ID 54763 is changed to be 33932.

In another example a GSM network has been updated. One of the changes is that for the cell 892 the ARFCN (frequency) has changed from channel 71 to 76 and BSIC (non-unique identifier) from 61 to 18. One of the radio profiles affected by the change is shown in Table 14. To compensate for the change, the zone profile is updated with the ARFCN and BSIC associated with cell ID 892 being updated with the new values.

TABLE 14

| Cell ID | ARFCN | BSIC | RxLev Mean | Sigma |
|---|---|---|---|---|
| 25068 | 95 | 38 | −60.0 | 9 |
| 54763 | 81 | 59 | −88.3 | 9 |
| 18322 | 67 | 46 | −92.1 | 9 |
| 892 | 71 | 61 | −98.7 | 9 |
| 18581 | 73 | 34 | −103 | 9 |

Signal Level Changes

Changes to the transmit power, antenna type, antenna azimuth, antenna down-tilt, and antenna (cell) location may affect the received signal level at system elements. The data associated with the system element can be updated by determining the net change in transmission power radiated in the direction of the system element from the cell and subsequently updating the system element accordingly. The following sections describe how changes to different parameters are accounted for where the system elements are zone profiles. The changes are additive when power is measured in dB. For example if a cell increased transmission power by 3 dB and the azimuth rotated 5 degrees clockwise then the change to the system element will be the 3 dB increase plus the change due to the antenna orientation.

If the transmit power for cell 45241 increases by 4.5 dB then all zone profiles that include the received signal strength for cell 45241 need to increased the expected receive signal strength for cell 45241 by 4.5 dB. So a zone profile that included a reference to cell 45241 with an expected received signal strength of −78 dBm would be updated to −73.5 dBm.

When an antenna azimuth is changed, the effect is that the power transmitted in some directions is higher and in others lower. The change is particularly noticeable when the location of the zone profile is not in the main lobe of the antenna.

The process for determining the effect of an antenna azimuth change is to find the difference between antenna gain towards a zone profile before the change and after the change. The antenna gain in a given direction relative to the antenna boresight can be obtained from the manufacturer's specification for the antenna or by using a generic model for the antenna. Once the antenna gain difference towards the zone has been calculated the change needs to be applied. FIG. 14 illustrates a cell denoted by the solid circle and a model of its horizontal antenna pattern. The antenna boresight is pointing due North. The gain of this antenna on the boresight is 12.4 bBi. The antenna gain towards zone denoted Zone 1 which is 10 degrees off the antenna boresight is 11.6 dBi. The antenna gain towards zone denoted Zone 2 which is 100 degrees off the antenna boresight is −8.6 dBi. FIG. 15 illustrates the cell with the antenna re-oriented to point 10 degrees west of north. As a result the gain towards zone 1 is now 10.6 dBi, a drop of 1 dB. As such the expected signal level at zone 1 reduces from −75 dB (Table 15) to −76 dB (Table 16). The gain towards zone 2 is now −13.1 dBi, a drop of 4.5 dB. As such the expected signal level at zone 2 reduces from −94 dB (Table 17) to −98.4 dB (Table 18).

TABLE 15

| Cell ID | ARFCN | BSIC | RxLev Mean | Sigma |
|---|---|---|---|---|
| 25068 | 95 | 38 | −75.0 | 9 |

TABLE 16

| Cell ID | ARFCN | BSIC | RxLev Mean | Sigma |
|---|---|---|---|---|
| 25068 | 95 | 38 | −76.0 | 9 |

TABLE 17

| Cell ID | ARFCN | BSIC | RxLev Mean | Sigma |
|---|---|---|---|---|
| 25068 | 95 | 38 | −94.0 | 9 |

TABLE 18

| Cell ID | ARFCN | BSIC | RxLev Mean | Sigma |
|---|---|---|---|---|
| 25068 | 95 | 38 | −98.5.0 | 9 |

Adapting to a change in the downtilt of an antenna is similar to a change in azimuth except that the antenna's vertical gain pattern is used. The difference in the vertical antenna gain towards a zone profile before and after the downtilt adjustment is applied to the expected signal strength at the zone profile.

Adapting to a change of antenna model is similar to a change in azimuth. The difference in the horizontal and vertical gains in the direction of a zone profile is calculated and the difference applied to the expected signal strength at the zone profile.

Adjustments to antenna heights may have two effects. Firstly the change in height affects the vertical gain to a given system element as the vertical angle to the system element has changed. The effect this has on the system element is calculated in the same manner as for a change in the downtilt.

Secondly the change in height can change the expected signal level to be received at a given system element. The method is to use a radio propagation model to estimate the received signal level at a system element before the antenna height is changed and again with the new antenna height. The difference between the two estimates is then applied to the system element. Optionally the radio propagation model will include terrain information to take into account the increase or decrease in the coverage offered by a cell due to the antenna height change. Optionally the radio propagation model will also include the effect of other signals in terms of interference and the hearability of other cells at the system element under consideration and for other system elements.

Changes to an antenna location can affect the horizontal gain towards a system element, the vertical gain towards a system element, may involve a change in the antenna model, antenna height and range to the system element. The techniques above describe how to deal with all of the effects except for the change in range. A change in range is adapted to by using a radio propagation model to estimate the difference in received signal strength at a given system element's location due to the change in range. The difference is then applied to the expected received signal strength at the system element. This approach is similar to that used to adjust for the effect of height on the received signal strength.

In some cases it may also be necessary to adapt the sigma for an affected profile element, when there is some uncertainty associated with predicting the effect of the change in cell configuration. As an example consider a change involving relocation of a cell antenna by 100 metres. In this case the radio channel between the cell and the zone may exhibit significantly different shadow fading. Such effects are well known in the art of mobile radio propagation modeling where the correlation in shadow fading between two reception points separated by 100 metres is typically close to zero. Accordingly using the present example of a shift of 100 m in the cell antenna location, after adjusting the rxLevMean based on modeling, the sigma for cell 25068 would be increased to reflect the greater uncertainty associated with the profile mean rxLev. As an example an increase of 3 dB might be applied.

In the case of a significant change in antenna location, if an affected zone profile also features signal timing elements, these may also have to be updated.

The effect on received signal strength due to multiple network configuration changes is determined by accumulating the changes due to each of the changes independently. When the differences in received signal strength are measured in dB the accumulation is simply additive. For example if the transmit power for cell 45241 was increased by 4.5 dB and its antenna azimuth was rotated 10 degrees to counterclockwise such that a system element was estimated to see a 1 dB drop in signal strength, then the impact for the system element with regard to cell 45241 in question is an increased in the expected signal strength of 3.5 dB.

An alternative to the step-wise accumulation of the effect of different changes to a cell is to use a radio propagation model that incorporates all of the parameters. Such a model can include the effects of co-channel, adjacent channel and alternate channel interference on the hearability of a given signal at a given location. The model can be run with the network before and after the changes. The difference between the received signal strengths is then applied to the zone profile. This approach has the advantage of effectively calibrating the simulation with the more accurate signal strength stored within the profile.

An advantage of this approach is the ability to detect network changes that result in an existing or new cell becoming hearable in a zone.

A similar advantage is the ability to detect network changes, including the presence of new cells that result in an existing cell becoming unhearable in a zone due to the expected signal level dropping below the receiver noise floor or excessive interference.

If a cell is deemed to be interfered with and thus no longer hearable, the preferred option is to leave the cell in the zone definition with the updated zone definition parameters but to flag the cell as one to be ignored. That is the cell is not considered by the zone detection algorithm whether it is heard or not. One of the advantages of this is that the cell is still in the zone definition should a future network change mean that the cell is no longer interfered with. Another option is to remove the interfered cell from the zone definition. This will reduce the amount of processing the zone detection algorithm needs to do on each iteration. Yet another option is to maintain for each zone a list of cells, along with their associated zone parameters, that have been heard in the zone but are not hearable given the current network configuration. When further network configuration changes are made in the future, the network simulation considers, in addition to cells in the zone profile, cells on the list are evaluated as candidates for inclusion in the zone profile.

If a cell becomes hearable in a zone as a result of changes to the network the cell can be adapted to using the same techniques as for newly commissioned cells discussed elsewhere in this specification. If the cell had previously been hearable in the zone but removed as a result of an earlier network change, the cell could be reinstated to the zone profile provided the zone profile parameters associated have been retained. The cell is reinstated with the earlier parameter values appropriately adapted to for the changes between the earlier network configuration and the new network configuration.

New Cells

When a new cell is commissioned, the cell may be added to the zone profile for any zone in which the new cell is determined to be potentially hearable. This may degrade the performance of the zone detection as the new cell will otherwise be treated as an unmatched cell if it turns out not to be hearable. Typically there are two steps to updating zones due to the presence of a new cell. The first step is to determine which zones require updating. The second step is to take an action to update the zone to compensate for the presence of the new cell.

FIG. 16 illustrates a process flow for dealing with the presence of a new cell. The process starts at step 800, after which the process receives information that a new cell has been detected. In steps 801, 802 and 803, for each zone, a determination is made as to whether the zone profile is affected by the new cell. If so, the zone profile is updated in step 804 and the updated profile is sent to each mobile radio terminal using the zone in step 805. The process ends in step 806. The process interacts with database 50 in steps 802, 804 and 805 to compare data and update data.

The following methods describe means for determining which zones may be affected by the new cell. These methods can be broadly classified as being based on the hearability of the signal in the zone or based on the proximity of the zone to the new cell.

Updating Zones Deemed Affected by a New Cell

One method of determining the impact of a new cell on a zone profile is to have the zone re-measured, thus capturing not only the received signal level of the new cell but the effect it has on the hearability of other cells in the zone. The user of each such zone is sent a text message requesting that they re-register the zone. In PCT/AU2006/001479, there is described a method for controlling permission over zone registration. If this method is employed the user of each affected zone may be sent a message by the location server to enable the zone registration facility.

Another method is to add the new cell to each zone deemed affected by the new cell with the ignore flag applied. This ensures that the presence of the new cell does not affect the zone detection performance by being considered an unmatched cell. However, the presence of the cell will affect the zone performance in so far as the reporting of the new cell by the mobile means that it may not report other cells that are known.

A variation on the ignore flag is to use it as a means of determining more accurately in which zones the new cell can be heard. If the mobile radio terminal is in a zone and it can hear the new cell, the mobile radio terminal is sent a message informing the user that the zone needs to be re-registered. This can be done using the software in the mobile radio terminal. It can also be done via the mobile radio terminal sending a message to the server and the server responding with a message to the user and if required, permission to register the zone. In this manner the shortcomings of waiting for the mobile radio terminal to report the new cell before re-registering are overcome. Until such time as the zone is re-registered, the impact of the new cell is minimised by the use of the ignore flag. This approach also has the advantage of detecting the new cell at any time in the zone and not just when a zone transition triggers a zone status update. After a period of time has elapsed since the new cell became active, for example 30 days, the new cell is removed from any zone that did not detect the cell whilst in the zone. This avoids having zone profiles cluttered with unnecessary cells.

Yet another method of updating the zone profiles is to add the cell to those zones that have been deemed affected with a signal level derived using simulation techniques. As mentioned previously the use of a signal strength model is dependent upon having an estimate of the zone's location.

A signal strength model, for example Hata, can be used to estimate the signal strength of the new cell in a given zone. It is well known in the art that the output of such models is generally inaccurate as the models do not take into account effects specific to the propagation path between the transmitter and the zone. To compensate for this inaccuracy the signal strength standard deviation associated with the cell can be made larger. The increase can be in the range about 0 dBm to about 18 dBm, about 0 dBm to about 3 dBm, about 1 dBm to about 5 dBm, about 3 dBm to about 9 dBm. This results in any differences between the measured signal strength and the expected signal strength being evaluated to a lower cost. If there is uncertainty associated with the zone location, the signal strength variation can be increased to compensate.

In the particular case where the new cell is collocated with an existing cell, for example an 1800 MHz cell installed on a site that previously only had 900 MHz cells. In this case simulations are used to estimate the received strength of both cells and the difference calculated. The difference is then added to the signal level in the zone profile of the existing cell to obtain the value for the new cell. In effect the existing signal level in the zone profile is used to calibrate the simulation. The approach works because the shadow fading between the cell and the zone will be strongly correlated due to the commonly transmission path. For example cell 55615 is in a zone profile with a signal strength of −85 dBm. A new cell 45615 is installed at the same site. Simulation estimates show that the expected signal strength for cell 45615 in the zone is 6 dB lower than for 55615. Note that the absolute signal strength values are not relevant other than to compute the difference. As such the cell 45615 is added to the profile with a signal strength of −91 dB.

If a new cell is detected within a mobile, the mobile will not necessarily have all of the information with which to deal with the inconsistency by updating its zone profile, even on a temporary basis. If the mobile detects a potentially new cell the mobile can implement one or more of the following options:

Leave the zone status as "out" and send a message to the server to indicate the possibility of the new cell. The message could be a dedicated message or a status update with the associated measurement data attached.

The mobile terminal can set the zone status to be "in" and send a message to the server to indicate the possibility of the new cell. The message could be a dedicated message or a status update with the associated measurement data attached.

The mobile terminal can add the cell to its zone profile, flag the cell to be ignored, and send a message to the server informing it of the action.

Decommissioned Cells

When a cell has been decommissioned from a network the preferred method for adapting zone profiles to the change is to remove the cell from each zone profile that references the cell. Optionally the system can retain the zone profile parameters associated with the decommissioned cell such that should the cell be recommissioned in the future the zone can be accurately updated.

An alternative implementation is to apply the ignore flag to the cell in all affected zone profiles. There is no advantage to this approach is the cell has been decommissioned.

In a further aspect of dealing with decommissioned cells is the use of radio network simulations to determine the wider effects of decommissioning the cell. The profiles affected directly can be determined by observation as noted above. A further effect is that the decommissioned site reduces the level of interference on the frequency used by the decommissioned cell and adjacent frequency channels. Simulation can be used to see if any profiles need to be updated with additional cells that become hearable at specific locations due to the reduced interference.

Applying the Ignore Flag

The ignore flag can be used as a method for adapting to network changes. The flag can be applied and removed automatically triggered by an event or time in the server or the mobile. The system operator can also apply the ignore flag via a management interface or as a parameter associated with each cell in the network database. The mechanism for invoking the ignore flag are discussed below:

The use of the ignore flag can be controlled from the location server whereby the location server sends commands to one or more mobile terminals to ignore one or more cells on one or more profiles. As discussed above the server would also send commands to add cells to the profile that are to be ignored. The server would similarly issue commands to clear the ignore flag and/or remove the temporary entry to the profile. In the case of cells that are temporarily non-operational the server can optionally inform the mobile terminal that the ignore flag can be cleared once the nominated cell is again detected by the mobile terminal.

The mobile radio terminal can implement the ignore flag without the intervention of the location server upon the detection of certain events by the mobile. An example of such an event is the detection of an unknown cell via the zone detection process as describe elsewhere in this specification. Optionally the mobile can place a time limit, for example 10 minutes, on the ignore flag on the assumption that the location server will have responded within this time with an action for the mobile, which may simply be to continue using the ignore flag.

Zone Re-Registration

A method that can be used to adapt to changes in a network configuration is to re-measure, also referred to as re-registering, the zone once the network changes have been implemented. This is particularly useful if new cells have been commissioned. This process will result in a new zone profile being generated and as such will accurately compensate for any impacts the network changes have had on the radio measurements that define the zone. The process works by the system sending the application in the mobile terminal a message that results in the mobile terminal enabling a function that allows the subscriber to initiate the registration process. This can be implemented under a range of optional controls. Optionally the system can estimate which zones may be affected by the changes and allow each of those zones to be re-registered. Optionally the system can limit the set of zones permitted to re-register to those where the impact of the changes are deemed significant. The definition of significant changes includes the presence of a new cell and changes in expected received signal strength that exceed a defined threshold such as 3 dB. Optionally the system can delete any zone profile that has not been re-registered within a defined time window. For example a subscriber is given a week in which to re-register a zone after a network change after which time the existing zone profile is deleted and any related service suspended until the zone is re-registered. Optionally the system can remove the permission to re-register the zone if the subscriber has not availed themselves of the opportunity within a prescribed time; for example 2 weeks. The system may optionally send a message to the subscriber informing them that zone re-registration permission has been granted due to possible impacts on zone detection performance. Similarly a text message can be sent informing subscribers that they must re-register the zone if that option is implemented. Optionally the mobile terminal can be informed of the presence of a new cell and to ignore the new cell. If the new cell if detected when the mobile terminal is within the zone, the zone is permitted to be re-registered. This permission can be granted automatically by the mobile terminal or in response to the mobile terminal notifying a central server of the presence of the new cell and the permission being granted by the central server.

Propagating Changes

Once the updates have been computed for a zone profile the updated profile will be transmitted to each system element, for example mobile radio terminals that require that zone profile definition. This may occur irrespective of the nature of the change: a change to one or more identifiers, a change to one or more signal strength parameters, or a change to the application parameters such as application or clearing of the ignore flag.

Adapting Zone Profiles to Seasonal Variations

In some geographical regions seasonal variation in foliage can result in significant changes to signal levels received by mobiles in the cellular frequency bands. In this case, the system of this invention can apply a suitable correction factor to compensate for the changing signal attenuation between the base stations and subscriber zones. This type of correction is more likely to be required in suburban and rural areas where the density of trees may be significant.

Definition of Database

When referring to a database in this specification, a database is defined as a repository for data pertaining to a radio network, the operational status of said radio network, data associated with zone radio profiles, and data associated with aspects of this invention. As such the database can contain radio network parameters which can include for each cell radio access technology (eg GSM, IS-95, UMTS, CDMA-2000)
    antenna model
    antenna beamwidth
    antenna downtilt
    antenna height
    antenna azimuth
    antenna coordinates
    transmit frequency
    cell id
    BSIC (GSM)
    PSC (3 G)
    Propagation model type and parameters
    Propagation environment classification
    Median distance to neighbouring cells Operational Status
  Operating or not
  Scheduled down-time
  Schedule uptime
  Ignore flag status
Zone Radio Profile Parameters which can Include
  Nominal zone location
  Estimated zone location
  Zone parameters as defined in previously-incorporated patent application PCT/AU2006/000478 entitled "Enhanced Terrestrial Mobile Location"
  For each cell defined in the zone profile
  Cell ID
  Transmit frequency
  Other cell identifiers
  Expected
  Ignore flag status
  Permission to automatically clear the ignore flag
Parameters Pertaining to Detecting Inconsistencies and Propagating Network Changes which can Include
  For each cell
  Ignore flag status
  Accumulated evidence that a cell is not operating
  Inconsistency status The above lists of database fields are not exhaustive. Given this and related specifications, those of ordinary skill in the art will be able to add parameters as required to implement required features and functionality. Similarly parameters not required for a given feature need not be included in the database.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

The invention claimed is:

1. A method for managing an inconsistency between a radio communications network and a network database in a zone-based location system, the method comprising:
   receiving a notification of an inconsistency;
   identifying at least one zone profile affected by the inconsistency;
   updating the at least one zone profile to compensate for the inconsistency;
   identifying at least one mobile radio terminal associated with the at least one zone profile; and
   transmitting the at least one zone profile to the at least one mobile radio terminal associated with the at least one zone profile.

2. A method as claimed in claim 1 further comprising informing a system operator of the inconsistency.

3. A method as claimed in claim 1 further comprising updating the network database to remove the inconsistency.

4. A method as claimed in claim 3 wherein the step of updating the network database comprises updating respective network databases on one or more mobile radio terminals in the radio communications network.

5. A zone-based location system configured for managing an inconsistency between a radio communications network and a network database, the system comprising:
   a server; and
   a memory in communication with the server having instructions stored therein configured to cause the server to execute the steps of:
   receiving a notification of an inconsistency;
   identifying at least one zone profile affected by the inconsistency;
   updating the at least one zone profile to compensate for the inconsistency;
   identifying at least one mobile radio terminal associated with the at least one zone profile; and
   transmitting the at least one zone profile to the at least one mobile radio terminal associated with the at least one zone profile.

6. A method as claimed in claim 1 further comprising flagging data in the network database relating to the inconsistency such that the flagged data will be ignored.

7. A system as claimed in claim 5 further comprising informing a system operator of the inconsistency.

8. A system as claimed in claim 5 further comprising updating the network database to remove the inconsistency.

9. A system as claimed in claim 8 wherein updating the network database comprises updating respective network databases on one or more mobile radio terminals in the radio communications network.

10. A system as claimed in claim 5 further comprising flagging data in the network database relating to the inconsistency such that the flagged data will be ignored.

11. A method of managing an inconsistency between a radio communications network and a network database, the method comprising:
    receiving a notification of the inconsistency;
    determining whether any mobile radio terminals in the radio communications network are affected by the inconsistency; and
    transmitting a communication to one or more of the mobile radio terminals that were determined to be affected by the inconsistency to compensate for the inconsistency;
    wherein the step of determining whether any mobile radio terminals are affected by the inconsistency comprises determining whether one or more zones defined in the radio communications network are affected by the inconsistency and determining whether any mobile radio terminals are associated with one or more of the one or more zones.

12. A method as claimed in claim 11 further comprising updating respective profiles defining the one or more zones determined to be affected by the inconsistency.

13. A method as claimed in claim 12 wherein the step of transmitting a communication to the one or more of the mobile radio terminals that were determined to be affected by the inconsistency comprises transmitting the updated profile to the one or more mobile radio terminals.

14. A method as claimed in claim 11 wherein the step of transmitting the communication to the one or more of the mobile radio terminals that were determined to be affected by the inconsistency to compensate for the inconsistency comprises transmitting an ignore flag such that data associated with the inconsistency is ignored.

15. A zone-based location system configured for managing an inconsistency between a radio communications network and a network database, the system comprising:

a server; and a memory in communication with the server having instructions stored therein configured to cause the server to execute the steps of:

receiving a notification of the inconsistency;

determining whether any mobile radio terminals in the radio communications network are affected by the inconsistency; and transmitting a communication to one or more of the mobile radio terminals that were determined to be affected by the inconsistency to compensate for the inconsistency;

wherein determining whether any mobile radio terminals are affected by the inconsistency comprises determining whether one or more zones defined in the radio communications network are affected by the inconsistency and determining whether any mobile radio terminals are associated with one or more of the one or more zones.

16. A system as claimed in claim 15 further comprising updating respective profiles defining the one or more zones determined to be affected by the inconsistency.

17. A system as claimed in claim 16 wherein transmitting a communication to the one or more of the mobile radio terminals that were determined to be affected by the inconsistency comprises transmitting the updated profile to the one or more mobile radio terminals.

18. A system as claimed in claim 15 wherein transmitting the communication to the one or more of the mobile radio terminals that were determined to be affected by the inconsistency to compensate for the inconsistency comprises transmitting an ignore flag such that data associated with the inconsistency is ignored.

19. A system as claimed in claim 15 wherein determining whether any mobile radio terminals in the radio communications network are affected by the inconsistency and transmitting a communication to one or more of the mobile radio terminals that were determined to be affected by the inconsistency to compensate for the inconsistency are provided by a network processor.

20. A system as claimed in claim 19 wherein the network processor is a location server.

21. A method for managing a change in a radio communications network, the method comprising:

identifying one or more zones defined by a respective profile in the radio communications network that are affected by the change, the respective profile containing data relating to one or more cells;

for each cell in the respective profile, determining whether the cell is significantly affected by the change; and if the cell is determined to be significantly affected by the change, flagging the respective profile for updating to compensate for the change.

22. A method as claimed in claim 21 wherein the change is a new base station in the radio communications network.

23. A method as claimed in claim 21 wherein the change is due to a non-operational base station.

24. A system for managing a change in a radio communications network, the system comprising:

means for identifying one or more zones defined by a respective profile in the radio communications network that are affected by the change, the respective profile containing data relating to one or more cells;

means for, for each cell in the respective profile, determining whether the cell is significantly affected by the change; and means for, if the cell is determined to be significantly affected by the change, flagging the respective profile for updating to compensate for the change.

25. A system as claimed in claim 24 wherein the means for identifying one or more zones defined by a respective profile in the radio communications network that are affected by the change, the respective profile containing data relating to one or more cells; the means for, for each cell in the respective profile, determining whether the cell is significantly affected by the change; and the means for, if the cell is determined to be significantly affected by the change, flagging the respective profile for updating to compensate for the change, are provided by a network processor.

26. A system as claimed in claim 25 wherein the network processor is a location server.

* * * * *